(12) United States Patent
Lee et al.

(10) Patent No.: US 12,412,575 B2
(45) Date of Patent: Sep. 9, 2025

(54) ELECTRONIC DEVICE AND METHOD FOR PROVIDING LIST OF SUGGESTED UTTERANCES

(71) Applicant: SAMSUNG ELECTRONICS CO., LTD., Suwon-si (KR)

(72) Inventors: Junho Lee, Suwon-si (KR); Youngsub Ko, Suwon-si (KR); Joohwan Kim, Suwon-si (KR); Jaechul Lee, Suwon-si (KR); Youngjin Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 324 days.

(21) Appl. No.: 18/071,950

(22) Filed: Nov. 30, 2022

(65) Prior Publication Data

US 2023/0169973 A1 Jun. 1, 2023

Related U.S. Application Data

(63) Continuation of application No. PCT/KR2022/014758, filed on Sep. 30, 2022.

(30) Foreign Application Priority Data

Dec. 1, 2021 (KR) ........................ 10-2021-0169712

(51) Int. Cl.
*G10L 15/00* (2013.01)
*G10L 15/22* (2006.01)

(52) U.S. Cl.
CPC ........ *G10L 15/22* (2013.01); *G10L 2015/223* (2013.01); *G10L 2015/225* (2013.01)

(58) Field of Classification Search
CPC ... G10L 15/22; G10L 2015/223; G10L 15/26; G10L 2015/228; G10L 15/1815;
(Continued)

(56) References Cited

U.S. PATENT DOCUMENTS 7,136,817 B2 11/2006 Schröder et al.
10,593,326 B2 * 3/2020 Teasley ................... G10L 15/22
(Continued)

FOREIGN PATENT DOCUMENTS

EP 3 664 081 6/2020
JP 2016-27688 2/2016
(Continued)

OTHER PUBLICATIONS

Extended European Search Report dated Oct. 28, 2024 in European Patent Application No. 22901543.3.
(Continued)

*Primary Examiner* — Abdelali Serrou
(74) *Attorney, Agent, or Firm* — Nixon & Vanderhye, P.C.

(57) ABSTRACT

An example electronic device may include a memory configured to store instructions and a processor electrically connected to the memory and configured to execute the instructions. When the instructions are executed by the processor, the processor may be configured to generate a first suggested-utterance list providable to a user and generate a second suggested-utterance list by extracting, from the first suggested-utterance list, utterances capable of successful execution for a device registered to the user, according to state information about the registered device.

14 Claims, 21 Drawing Sheets

(58) Field of Classification Search
CPC ......... G10L 2015/088; G10L 2015/225; G10L 15/30; G10L 17/00; G10L 2015/226; G10L 2015/227; G10L 15/005; G10L 15/063; G10L 15/08; G10L 15/1822; G10L 15/183; G10L 15/24; G10L 15/32; G10L 17/22; G10L 2015/0631; G10L 2015/0638; G10L 2021/02082; G10L 21/0208; G10L 15/07; G10L 25/54; G06F 3/167; G06F 3/165; G06F 40/58; G06F 16/243; G06F 16/3329; G06F 16/3338; G06F 16/3344; G06F 16/433; G06F 16/48; G06F 16/686; G06F 16/73; G06F 16/738; G06F 16/7867; G06F 21/32; G06F 21/604; G06F 21/606; G06F 21/62; G06F 2203/0381; G06F 3/013; G06F 3/0482; G06F 3/04842; G06F 40/169; G06F 40/242; G06F 40/279; G06F 40/30; G06F 40/51; G06F 16/10; G06F 16/685
See application file for complete search history.

(56) References Cited

U.S. PATENT DOCUMENTS

| | | | |
|---|---|---|---|
| 10,665,232 | B2 | 5/2020 | Thomsen |
| 10,887,351 | B2* | 1/2021 | Nanda ................... G06F 21/606 |
| 10,916,154 | B2 | 2/2021 | Amin et al. |
| 11,119,725 | B2* | 9/2021 | White ..................... G10L 17/00 |
| 11,544,458 | B2* | 1/2023 | Bellegarda ............. G06N 3/045 |
| 11,573,955 | B1* | 2/2023 | James ................. G06F 16/2228 |
| 11,972,463 | B1* | 4/2024 | Nguyen .................. G06F 40/30 |
| 12,216,673 | B2* | 2/2025 | Venkata ............ G06F 16/24534 |
| 2014/0039888 | A1 | 2/2014 | Taubman et al. |
| 2020/0184962 | A1* | 6/2020 | Chen ....................... G10L 15/22 |
| 2021/0117151 | A1 | 4/2021 | Cho et al. |
| 2021/0358486 | A1* | 11/2021 | Lee ....................... G06F 40/279 |

FOREIGN PATENT DOCUMENTS

| | | |
|---|---|---|
| KR | 10-2005-0015585 | 2/2005 |
| KR | 10-1456974 | 10/2014 |
| KR | 10-2020-0048701 | 5/2020 |
| KR | 10-2020-0085593 | 7/2020 |
| KR | 10-2021-0007580 | 1/2021 |
| KR | 10-2021-0017392 | 2/2021 |
| KR | 10-2021-0019272 | 2/2021 |
| KR | 10-2223016 | 3/2021 |

OTHER PUBLICATIONS

Search Report dated Jan. 10, 2023 in counterpart International Patent Application No. PCT/KR2022/014758.

* cited by examiner

Add Voice Capability

Voice Capability
Channel

Please select capability.

| Voice Action | Enumeration | Method | Description |
|---|---|---|---|
| Down | | POST | • "#{Device}, change the channel down." |
| Previous | | POST | • "#{Device}, return to the previous channel." |
| ☑ Set | | POST | • "#{Device}, set the channel to 11." |
| SetByName | | POST | • "#{Device}, turn the KBS channel." |
| Status | | GET | • "#{Device}, tell me channels." |
| Up | | POST | • "#{Device}, change the channel up." |

1    1-6 of 6 capabilities

[ ADD ]  [ CANCEL ]

FIG. 7D

Mode name mapping table 800

| attribute | en | ko | fr | de | it | es | pt |
|---|---|---|---|---|---|---|---|
| 01 | Normal | 표준 | Normal | Normal | Normale | Normal | Normal |
| 02 | Delicates | 블라우스 | Chemisiers | Blusen | Camicette | Blusas | Blusas |
| 03 | Sanitise | 살균 | Desinfection | Hygiene | Igienizzazi | Higiene | Higieniza |
| 04 | Quick | 급속 | Rapide | Schnell | Rapido | Rapido | Rapido |
| 05 | Sensor Dry | 스마트건조 | Capteur de s | Sensortro | Asciugatu | Secado co | Secagem |
| 06 | Rack Dry | 선반건조 | Grille de sech | Regaltrock | Ripiano di | Secado co | Secagem |
| 07 | Room Care | 공간제습 | Room Care | Room Care | Deumidifi | Room Car | Desumidif |
| 08 | Room Care | 공간제습 | Room Care | Room Care | Deumidifi | Room Car | Desumidif |
| 09 | Suit | 정장 | Costume | Anzug | Completi | Traje | Fato |
| 0A | School Wear | 교복 | Vetements d' | Schulunif | Vestiti scu | Ropa esco | Uniforme |
| 0B | Winter Coat | 겨울코트 | Manteau d'h | Winterma | Cappotti | Abrigos d | Casaco de |
| 0C | Down Jackets | 패딩 | Vestes en du | Daunenja | Piumini | Plumones | Quispos |
| 0D | Heavy Duty | 강력 | Puissant | Strapazier | Abiti da la | Potencia a | Roupa suj |
| 0E | Dust Care | 미세먼지 | Elimination p | Staubbese | Antipolver | Cuidado p | Cuidado c |
| 0F | Self Clean | 내부살균 | Autonettoyag | Selbstrein | Auto puliz | Autolimpi | Autolimpe |
| 10 | Outdoor | 아웃도어 | Exterieur | Outdoor | Sportivi | Ropa exte | Exterior |

FIG. 8A

Condition table 1080

| Utterance 1081 | Command 1082 | Value 1083 | Operator 1084 |
|---|---|---|---|
| Robot vacuum cleaner, empty dust bin. | /mode/vs/0 | {<br>  "x.com.samsung.da.modes":<br>  ["Control_Charging"]<br>} | True |
| | /view/vs/0 | {<br>  "x.com.samsung.da.visibles":<br>  ["DustEmit_Visible"]<br>} | True |
| | /mode/vs/0 | {<br>  "x.com.samsung.da.modes":<br>  ["Control_EmitDust"]<br>} | False |
| Robot vacuum cleaner, clean air conditioner area. | /map/vs/0 | {<br>  "x.com.samsung.da.mapExisted":<br>  ["Control_Charging"]<br>} | True |
| ... | ... | ... | |

FIG. 10B

ELECTRONIC DEVICE AND METHOD FOR PROVIDING LIST OF SUGGESTED UTTERANCES

CROSS-REFERENCE TO RELATED APPLICATIONS

This application is a continuation application of International Application No. PCT/KR2022/014758 designating the United States, filed on Sep. 30, 2022, in the Korean Intellectual Property Receiving Office and claiming priority to Korean Patent Application No. 10-2021-0169712, filed on Dec. 1, 2021, in the Korean Intellectual Property Office, the disclosures of which are incorporated by reference herein in their entireties.

BACKGROUND

1. Field

The disclosure relates to an electronic device and method for providing a suggested-utterance list.

2. Description of Related Art

A user may use an electronic device to receive various services. For example, advancement in voice recognition has enabled a voice assistant (e.g., a voice assistant service) through which a user may input a voice command (e.g., an utterance) to an electronic device and receive a response message in response to the input utterance.

The voice assistant may provide an utterance suggestion service to a user unfamiliar with the voice command to lower an entry barrier for the voice command. When artificial intelligence (AI) has limitations on understanding communication of a user, the utterance suggestion service shows a user an example of utterances that the AI has already learned to improve an utterance accuracy rate and induce the user to experience a convenient voice command so that the user may use the voice command more frequently.

SUMMARY

A voice assistant service currently available may suggest a fixed utterance for controlling an Internet of Things (IoT) device, not considering a user's context (e.g., information such as a state of the user's occupancy, day/night, a season, a retained device, and a status of the retained device). The fixed utterance may lead to an incorrect utterance suggestion, worsen a user's experience after failure of a voice command, and/or give a negative opinion on the voice command service. Accordingly, there may be a need for a technique for suggesting utterances to be successfully executed when a user gives the utterance.

One example embodiment may provide technology for generating a suggested-utterance list tailored to the user according to information about the user's retained device (e.g., a device registered to the user).

The technical goals to be achieved are not limited to those described above, and other technical goals not mentioned above will be clearly understood from the following description.

According to an embodiment, an electronic device may include a memory configured to store instructions and a processor electrically connected to the memory and configured to execute the instructions. When the instructions are executed, the processor is configured to generate a first suggested-utterance list providable to a user and generate a second suggested-utterance list by extracting, from the first suggested-utterance list, utterances capable of successful execution for a device registered to the user, according to state information about the registered device.

According to an embodiment, a method of operating an electronic device may include generating a first suggested-utterance list providable to a user and generating a second suggested-utterance list by extracting, from the first suggested-utterance list, utterances capable of successful execution for a device registered to the user according to state information about the registered device.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 7A, 7B, 7C, 7D, 7E, 7F, and 7G are diagrams illustrating example voice metadata according to various embodiments;

FIGS. 8A and 8B are diagrams illustrating an example mode-name mapping table according to various embodiments;

FIGS. 10A and 10B are diagrams illustrating an example operation of generating a suggested-utterance list according to various embodiments;

DETAILED DESCRIPTION

Figure 1:
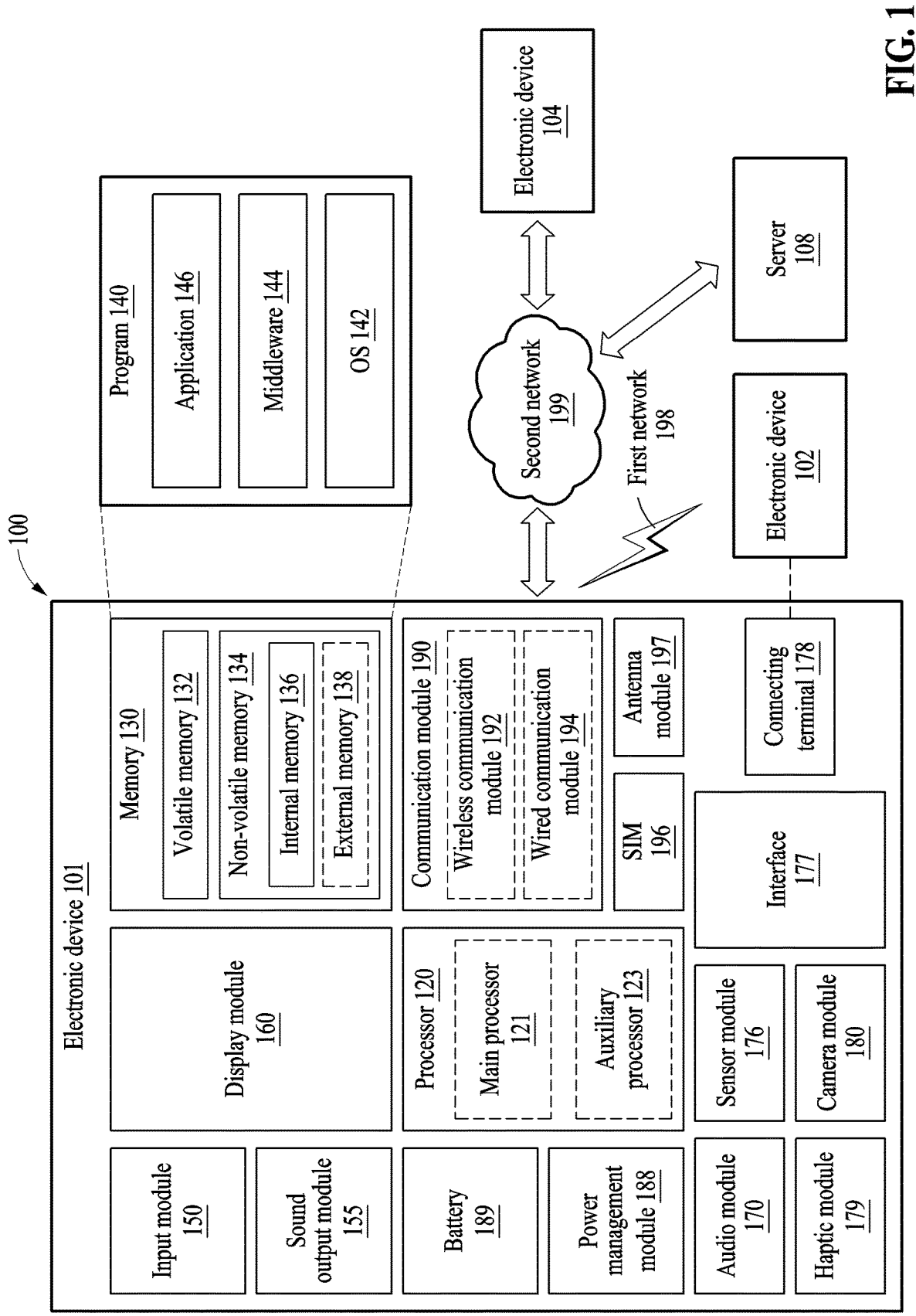
FIG. 1 is a block diagram illustrating an example electronic device 101 in a network environment 100 according to various embodiments.

Hereinafter, embodiments will be described in detail with reference to the accompanying drawings. When describing the embodiments with reference to the accompanying drawings, like reference numerals refer to like elements and a description related thereto will not be repeated.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be predetermined to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display module 160 may include a touch sensor adapted to detect a touch, or a pressure sensor adapted to measure the intensity of force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic device may include, for example, a portable communication device (e.g., a smartphone), a computer device, a portable multimedia device, a portable medical device, a camera, a wearable device, a home appliance device, or the like. According to an embodiment of the disclosure, the electronic device is not limited to those electronic devices described or mentioned above.

It should be understood that an embodiment of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C," each may include any one of the items listed together in the corresponding one of the phrases, or all possible combinations thereof. Terms such as "1st", "2nd", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with an embodiment of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" storage medium simply refers, for example, to a tangible device, and may not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
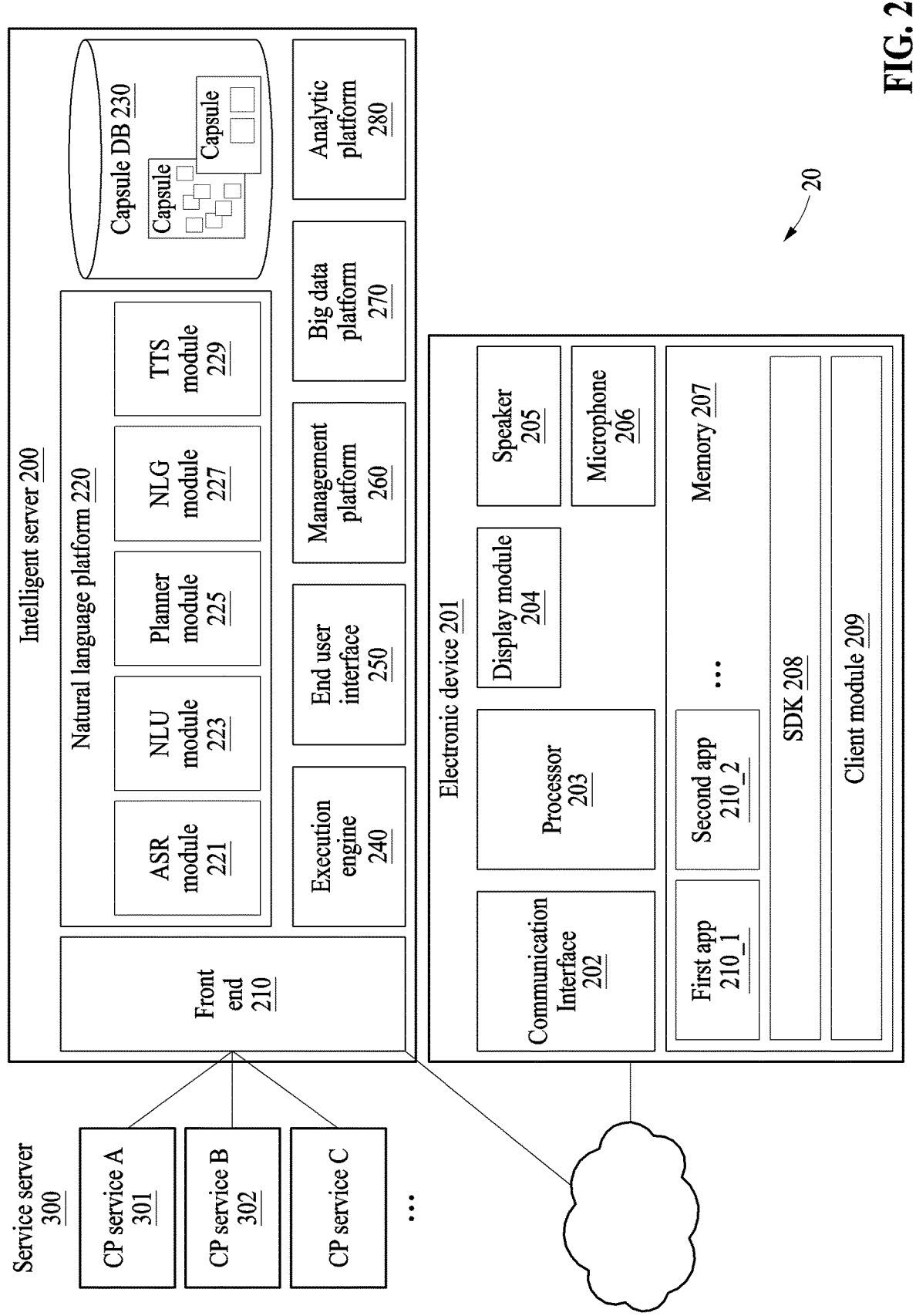
FIG. 2 is a block diagram illustrating an example integrated intelligence system according to various embodiments.

FIG. 2 is a block diagram illustrating an example integrated intelligence system according to various embodiments.

Referring to FIG. 2, an integrated intelligence system 20 according to an embodiment may include an electronic device 201 (e.g., the electronic device 101 of FIG. 1), an intelligent server 200 (e.g., the server 108 of FIG. 1), and a service server 300 (e.g., the server 108 of FIG. 1).

The electronic device 201 may be a terminal device (or an electronic device) connectable to the Internet and may be, for example, a mobile phone, a smartphone, a personal digital assistant (PDA), a laptop computer, a TV, a white home appliance, a wearable device, a head-mounted display (HMD), or a smart speaker.

According to the shown embodiment, the electronic device 201 may include a communication interface 202 (e.g., the interface 177 of FIG. 1), a microphone 206 (e.g., the input module 150 of FIG. 1), a speaker 205 (e.g., the sound output module 155 of FIG. 1), a display module 204 (e.g., the display module 160 of FIG. 1), a memory 207 (e.g., the memory 130 of FIG. 1), or a processor 203 (e.g., the processor 120 of FIG. 1). The components listed above may be operationally or electrically connected to each other.

The communication interface 202 may connect to an external device and be configured to transmit and receive data to and from the external device. The microphone 206 may receive a sound (e.g., a user utterance) and convert the sound into an electrical signal. The speaker 205 may output the electrical signal as sound (e.g., speech).

The display module 204 may be configured to display an image or video. The display module 204 may also display a graphic user interface (GUI) of an app (or an application program) being executed. The display module 204 may receive a touch input through a touch sensor. For example, the display module 204 may receive a text input through a touch sensor in an on-screen keyboard area displayed on the display module 204.

The memory 207 may store a client module 209, a software development kit (SDK) 208, and a plurality of apps 210. The client module 209 and the SDK 208 may configure a framework (or a solution program) for performing general-purpose functions. In addition, the client module 209 or the SDK 208 may configure a framework for processing a user input (e.g., a voice input, a text input, or a touch input).

The plurality of apps 210 stored in the memory 207 may be programs for performing designated functions. The plurality of apps 210 may include a first app 210_1 and a second app 210_2. Each of the plurality of apps 210 may include a plurality of actions for performing a designated function. For example, the apps may include an alarm app, a messaging app, and/or a scheduling app. The plurality of apps 210 may be executed by the processor 203 to sequentially execute at least some of the plurality of actions.

The processor 203 may control the overall operation of the electronic device 201. For example, the processor 203 may be electrically connected to the communication interface 202, the microphone 206, the speaker 205, and the display module 204 to perform a designated operation.

The processor 203 may also perform the designated function by executing the program stored in the memory 207. For example, the processor 203 may execute at least one of the client module 209 and the SDK 208 to perform the following operation for processing a user input. The processor 203 may control the operation of the plurality of apps 210 through, for example, the SDK 208. The following operation, which is the operation of the client module 209 or the SDK 208, may be performed by the processor 203.

The client module 209 may receive a user input. For example, the client module 209 may receive a voice signal corresponding to a user's utterance (hereinafter, referred to as a user utterance) sensed through the microphone 206. In an embodiment, the client module 209 may receive a touch input sensed through the display module 204. In an embodiment, the client module 209 may receive a text input sensed through a keyboard or an on-screen keyboard. In addition, the client module 209 may receive various types of user inputs sensed through an input module included in the electronic device 201 or an input module connected to the electronic device 201. The client module 209 may transmit the received user input to the intelligent server 200. The client module 209 may transmit state information about the electronic device 201 together with the received user input to the intelligent server 200. The state information may be, for example, execution state information about an app.

The client module 209 may receive a result corresponding to the received user input. For example, when the intelligent server 200 is capable of calculating a result corresponding to the received user input, the client module 209 may receive the result corresponding to the received user input. The client module 209 may display the received result on the display module 204. Furthermore, the client module 209 may output the received result as audio through the speaker 205.

The client module 209 may receive a plan corresponding to the received user input. The client module 209 may display results of executing a plurality of actions of an app according to the plan on the display module 204. For example, the client module 209 may sequentially display, on the display module 204, the results of executing the plurality of actions and output the results as audio through the speaker 205. For example, the electronic device 201 may display, on the display module 204, only a portion of the results of executing the plurality of actions (e.g., a result of the last action) and output the portion of the results as audio through the speaker 205.

According to an embodiment, the client module 209 may receive, from the intelligent server 200, a request for obtaining information necessary for calculating a result corresponding to the user input. According to an embodiment, the client module 209 may transmit the necessary information to the intelligent server 200, in response to the request.

The client module 209 may transmit information on the results of executing the plurality of actions according to the plan to the intelligent server 200. The intelligent server 200 may confirm that the received user input has been correctly processed using the information on the results.

The client module 209 may include a speech recognition module. According to an embodiment, the client module 209 may recognize a voice input for performing a limited function through the speech recognition module. For example, the client module 209 may execute an intelligent app for processing a voice input to perform an organic operation through a designated input (e.g., Wake up!).

The intelligent server 200 may receive information related to a user voice input from the electronic device 201 through a communication network. According to an embodiment, the intelligent server 200 may change data related to the received voice input into text data. According to an embodiment, the intelligent server 200 may generate a plan for performing a task corresponding to the user voice input, based on the text data.

According to an embodiment, the plan may be generated by an artificial intelligence (AI) system. The AI system may be a rule-based system or a neural network-based system (e.g., a feedforward neural network (FNN) or an RNN). Alternatively, the AI system may be a combination thereof or other AI systems. According to an embodiment, the plan may be selected from a set of predefined plans or may be generated in real time in response to a user request. For example, the AI system may select at least one plan from among the predefined plans.

The intelligent server 200 may transmit a result according to the generated plan to the electronic device 201 or transmit the generated plan to the electronic device 201. According to an embodiment, the electronic device 201 may display, on the display module 204, the result according to the plan. According to an embodiment, the electronic device 201 may display, on the display module 204, a result of executing an action according to the plan.

The intelligent server 200 may include a front end 210, a natural language platform 220, a capsule database (DB) 230, an execution engine 240, an end user interface 250, a management platform 260, a big data platform 270, or an analytic platform 280.

The front end 210 may receive the received user input from the electronic device 201. The front end 210 may transmit a response corresponding to the user input.

According to an embodiment, the natural language platform 220 may include an automatic speech recognition (ASR) module 221, a natural language understanding (NLU) module 223, a planner module 225, a natural language generator (NLG) module 227, or a text-to-speech (TTS) module 229.

The ASR module 221 may convert the voice input received from the electronic device 201 into text data. The NLU module 223 may discern an intent of a user using the text data of the voice input. For example, the NLU module 223 may discern the intent of the user by performing syntactic analysis or semantic analysis on a user input in the form of text data. The NLU module 223 may discern the meaning of a word extracted from the user input using a linguistic feature (e.g., a grammatical element) of a morpheme or phrase and determine the intent of the user by matching the discerned meaning of the word to an intent.

The planner module 225 may generate a plan using a parameter and the intent determined by the NLU module 223. According to an embodiment, the planner module 225 may determine a plurality of domains required to perform a task based on the determined intent. The planner module 225 may determine a plurality of actions included in each of the plurality of domains determined based on the intent. According to an embodiment, the planner module 225 may determine a parameter required to execute the determined plurality of actions or a result value output by the execution of the plurality of actions. The parameter and the result value may be defined as a concept of a designated form (or class). Accordingly, the plan may include a plurality of actions and a plurality of concepts determined by the intent of the user. The planner module 225 may determine a relationship between the plurality of actions and the plurality of concepts stepwise (or hierarchically). For example, the planner module 225 may determine an execution order of the plurality of actions determined based on the intent of the user, based on the plurality of concepts. In other words, the planner module 225 may determine the execution order of the plurality of actions based on the parameter required for the execution of the plurality of actions and results output by the execution of the plurality of actions. Accordingly, the planner module 225 may generate a plan including connection information (e.g., ontology) between the plurality of actions and the plurality of concepts. The planner module 225 may generate the plan using information stored in the capsule DB 230 that stores a set of relationships between concepts and actions.

The NLG module 227 may change designated information into a text form. The information changed to the text form may be in the form of a natural language utterance. The TTS module 229 may change information in a text form into information in a speech form.

According to an embodiment, some or all of the functions of the natural language platform 220 may be implemented in the electronic device 201 as well.

The capsule DB 230 may store information on the relationship between the plurality of concepts and actions corresponding to the plurality of domains. A capsule according to an embodiment may include a plurality of action objects (or action information) and concept objects (or concept information) included in the plan. According to an embodiment, the capsule DB 230 may store a plurality of capsules in the form of a concept action network (CAN). According to an embodiment, the plurality of capsules may be stored in a function registry included in the capsule DB 230.

The capsule DB 230 may include a strategy registry that stores strategy information necessary for determining a plan corresponding to a voice input. The strategy information may include reference information for determining one plan when there is a plurality of plans corresponding to the user input. According to an embodiment, the capsule DB 230 may include a follow-up registry that stores information on follow-up actions for suggesting a follow-up action to the user in a designated situation. The follow-up action may include, for example, a follow-up utterance. According to an embodiment, the capsule DB 230 may include a layout registry that stores layout information of information output by the electronic device 201. According to an embodiment, the capsule DB 230 may include a vocabulary registry that stores vocabulary information included in capsule information. According to an embodiment, the capsule DB 230 may include a dialog registry that stores information on a dialog (or an interaction) with the user. The capsule DB 230 may update the stored objects through a developer tool. The developer tool may include, for example, a function editor for updating an action object or a concept object. The developer tool may include a vocabulary editor for updating the vocabulary. The developer tool may include a strategy editor for generating and registering a strategy for determining a plan. The developer tool may include a dialog editor for generating a dialog with the user. The developer tool may include a follow-up editor for activating a follow-up objective and editing a follow-up utterance that provides a hint. The follow-up objective may be determined based on a current set objective, a preference of the user, or an environmental condition. In an embodiment, the capsule DB 230 may be implemented in the electronic device 201 as well.

The execution engine 240 may calculate a result using the generated plan. The end user interface 250 may transmit the calculated result to the electronic device 201. Accordingly, the electronic device 201 may receive the result and provide the received result to the user. The management platform 260 may manage information used by the intelligent server 200. The big data platform 270 may collect data of the user. The analytic platform 280 may manage a quality of service (QoS) of the intelligent server 200. For example, the analytic platform 280 may manage the components and processing rate (or efficiency) of the intelligent server 200.

The service server 300 may provide a designated service (e.g., a food order or hotel reservation) to the electronic device 201. According to an embodiment, the service server 300 may be a server operated by a third party. The service server 300 may provide, to the intelligent server 200, information to be used for generating a plan corresponding to the received user input. The provided information may be stored in the capsule DB 230. In addition, the service server 300 may provide result information according to the plan to the intelligent server 200.

In the example integrated intelligence system 20 described above, the electronic device 201 may provide various intelligent services to the user in response to a user input. The user input may include, for example, a physical button input, a touch input, or a voice input.

In an embodiment, the electronic device 201 may provide a speech recognition service through an intelligent app (or a speech recognition app) stored therein. In this example, the electronic device 201 may recognize a user utterance or a voice input received through the microphone and provide a service corresponding to the recognized voice input to the user.

In an embodiment, the electronic device 201 may perform a designated action alone or together with an intelligent server and/or a service server, based on the received voice input. For example, the electronic device 201 may execute an app corresponding to the received voice input and perform a designated action through the executed app.

In an embodiment, when the electronic device 201 provides a service together with the intelligent server 200 and/or the service server, the electronic device 201 may detect a user utterance using the microphone 206 and generate a signal (or voice data) corresponding to the detected user utterance. The electronic device 201 may transmit the voice data to the intelligent server 200 using the communication interface 202.

The intelligent server 200 may generate, as a response to the voice input received from the electronic device 201, a plan for performing a task corresponding to the voice input or a result of performing an action according to the plan. The plan may include, for example, a plurality of actions for performing a task corresponding to a voice input of a user, and a plurality of concepts related to the plurality of actions. The concepts may define parameters input to the execution of the plurality of actions or result values output by the execution of the plurality of actions. The plan may include connection information between the plurality of actions and the plurality of concepts.

The electronic device 201 may receive the response using the communication interface 202. The electronic device 201 may output a voice signal internally generated by the electronic device 201 to the outside using the speaker 205, or output an image internally generated by the electronic device 201 to the outside using the display module 204.

Figure 3:
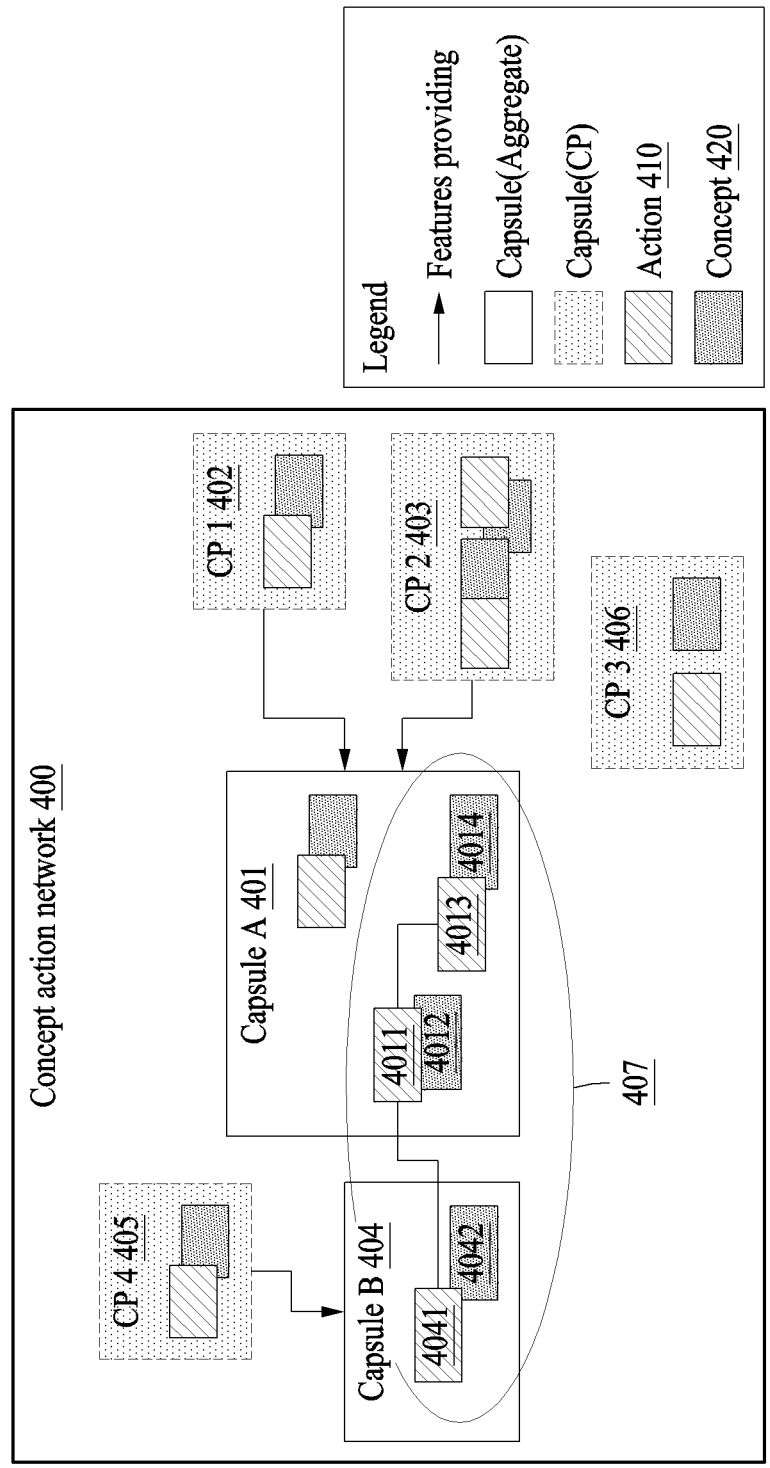
FIG. 3 is a diagram illustrating a form in which relationship information between concepts and actions is stored in an example database according to various embodiments.

FIG. 3 is a diagram illustrating a form in which relationship information between concepts and actions is stored in an example database according to various embodiments.

A capsule DB (e.g., the capsule DB 230) of the intelligent server 200 may store capsules in the form of a concept action network (CAN) 400. The capsule DB may store an action for processing a task corresponding to a voice input of a user and a parameter necessary for the action in the form of a CAN.

The capsule DB may store a plurality of capsules (a capsule A 401 and a capsule B 404) respectively corresponding to a plurality of domains (e.g., applications). According to an embodiment, one capsule (e.g., the capsule A 401) may correspond to one domain (e.g., a location (geo) or an application). Further, the one capsule may correspond to at least one service provider (e.g., CP 1 402 or CP 2 403) for performing a function for a domain related to the capsule. According to an embodiment, one capsule may include at least one action 410 for performing a designated function and at least one concept 420.

The natural language platform 220 may generate a plan for performing a task corresponding to the received voice input using the capsules stored in the capsule DB. For example, the planner module 225 of the natural language platform 220 may generate the plan using the capsules stored in the capsule DB. For example, a plan 407 may be generated using actions 4011 and 4013 and concepts 4012 and 4014 of the capsule A 401 and an action 4041 and a concept 4042 of the capsule B 404.

Figure 4:
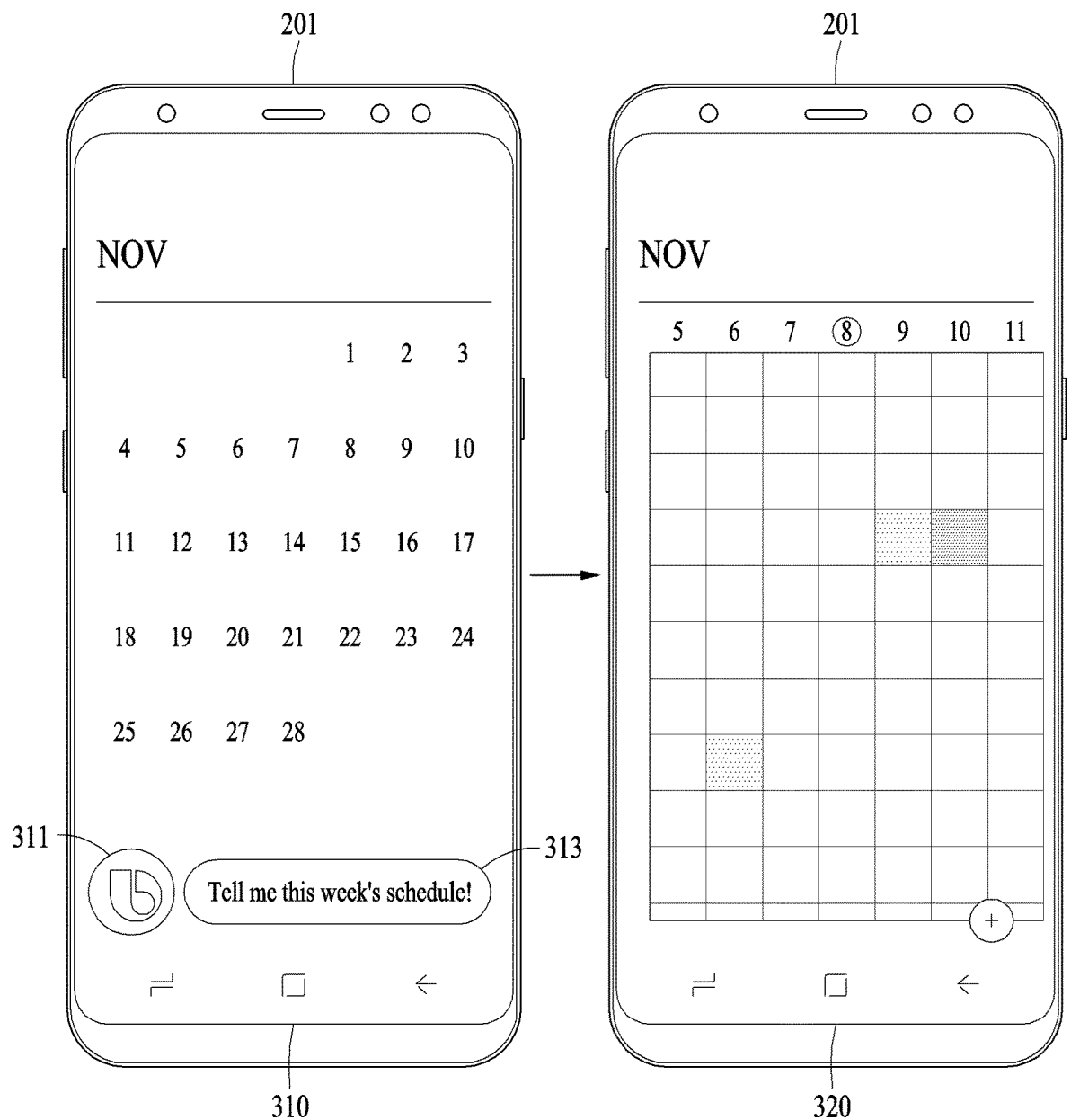
FIG. 4 is a diagram illustrating a screen of an example electronic device processing a received voice input through an intelligent app according to various embodiments.

FIG. 4 is a diagram illustrating a screen of an example electronic device processing a received voice input through an intelligent app according to various embodiments.

The electronic device 201 may execute an intelligent app to process a user input through the intelligent server 200.

According to an embodiment, on a screen 310, when a designated voice input (e.g., Wake up!) is recognized or an input through a hardware key (e.g., a dedicated hardware key) is received, the electronic device 201 may execute an intelligent app for processing the voice input. The electronic device 201 may execute the intelligent app, for example, when a scheduling app is being executed. According to an embodiment, the electronic device 201 may display, on the display module 204, an object (e.g., an icon) 311 corresponding to the intelligent app. According to an embodiment, the electronic device 201 may receive a voice input by a user utterance. For example, the electronic device 201 may receive a voice input of "Tell me this weeks schedule!". According to an embodiment, the electronic device 201 may display, on the display module 204, a user interface (UI) 313 (e.g., an input window) of the intelligent app in which text data of the received voice input is displayed.

According to an embodiment, on a screen 320, the electronic device 201 may display, on the display module 204, a result corresponding to the received voice input. For example, the electronic device 201 may receive a plan corresponding to the received user input and display "this weeks schedule" on the display module 204 according to the plan.

Figure 5:
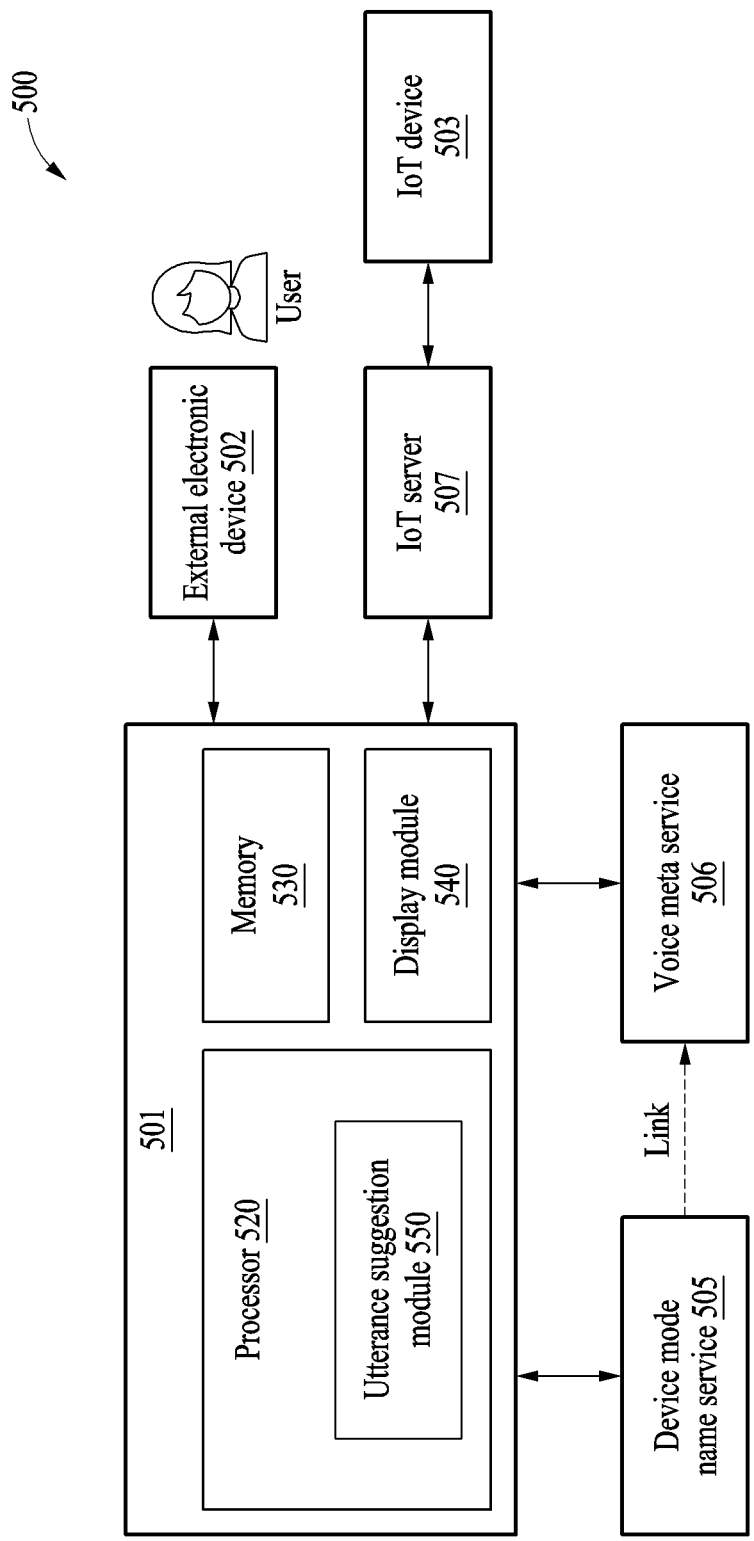
FIG. 5 is a diagram illustrating an example suggested-utterance system according to various embodiments.

FIG. 5 is a diagram illustrating an example suggested-utterance system according to various embodiments.

Referring to FIG. 5, according to an embodiment, a suggested-utterance system 500 may include an electronic device 501 (e.g., the electronic device 101 of FIG. 1, the electronic device 201 of FIG. 2, or the intelligent server 200 of FIG. 2), an external electronic device 502 (e.g., the electronic device 102 of FIG. 1 or the electronic device 104 of FIG. 1), an IoT device 503 (e.g., the electronic device 102 of FIG. 1 or the electronic device 104 of FIG. 1), a device mode name service 505, a voice meta service 506, and an IoT server 507 (e.g., the server 108 of FIG. 1). The device mode name service 505 and the voice meta service 506 may each be implemented as a server (e.g., a server device) and some and/or all of the device mode name service 505 and the voice meta service 506 may, for example, be implemented in the electronic device 501 and/or an intelligent server (e.g., the intelligent server 200 of FIG. 2).

The electronic device 501, the external electronic device 502, the IoT device 503, the device mode name service 505, the voice meta service 506, and the IoT server 507 may be connected to each other through a LAN, a WAN, a value added network (VAN), a mobile radio communication network, a satellite communication network, or a combination thereof. The electronic device 501, the external electronic device 502, the IoT device 503, the device mode name service 505, the voice meta service 506, and the IoT server 507 may communicate with one another via a wired communication method or a wireless communication method (e.g., wireless LAN (Wi-Fi), Bluetooth, Bluetooth low energy, ZigBee, Wi-Fi direct (WFD), ultra wideband (UWD), infrared data association (IrDA), and near field communication (NFC). The electronic device 501 may be connected to the external electronic device 502 and the IoT device 503 through a gateway or a relay. In addition, the electronic device 501 may be directly connected to the devices 502 and 503 through a server (e.g., the IoT server 507). Also, the electronic device 501 may be connected to the external electronic device 502 and the IoT device 503 through a server (e.g., the IoT server 507 or the intelligent server 200 of FIG. 2).

According to an embodiment, the electronic device 501, the external electronic device 502, and the IoT device 503 may be implemented in at least one of a smartphone, a tablet personal computer (PC), a mobile phone, a speaker (e.g., an AI speaker), a video phone, an e-book reader, a desktop PC, a laptop PC, a netbook computer, a workstation, a server, a PDA, a portable multimedia player (PMP), an MP3 player, a mobile medical device, a camera, or a wearable device. Also, the electronic device 501, the external electronic device 502, and the IoT device 503 may be home appliances. For example, home appliances may include at least one of a television, a digital video disk (DVD) player, an audio system, a refrigerator, an air conditioner, a vacuum cleaner, an oven, a microwave oven, a washing machine, an air purifier, a set-top box, and a home automation control panel, a security control panel, a game console, an electronic key, a camcorder, or an electronic picture frame.

According to an embodiment, the electronic device 501, the external electronic device 502, and the IoT device 503 may be a device a user owns. A listening device that receives the user's utterance (e.g., a command) may be the electronic device 501 and/or the external electronic device 502. The electronic device 501 may receive the user's utterance directly from and/or through the external electronic device 502. The external electronic device 502 may include the IoT device 503. When the user's utterance is a device control utterance (e.g., an utterance for remotely controlling a device) for controlling an electronic device other than the electronic device 501, the IoT device 503 may be a target for the device control utterance and execute the user's command. The electronic device 501 may generate a first suggested-utterance list, which may be provided to the user, and provide the user with a second suggested-utterance list by extracting, from the first suggested-utterance list, utterances to be successfully executed for the user's retained device (e.g., the electronic device 501, the external electronic device 502, or the IoT device 503). The first suggested-utterance list and the second suggested-utterance list may be a suggested-utterance list based on user device (e.g., the user's retained device) and relate to a device control utterance for controlling the retained device.

According to an embodiment, the IoT server 507 may obtain, store, and manage device information (e.g., a device ID, a device type, information about capability of performing a function, and location information (e.g., information about a registration location)) about the user's retained device (e.g., the electronic device 501, the external electronic device 502 or the IoT device 503). The electronic device 501, the external electronic device 502, and the IoT device 503 may be devices previously registered in the IoT server 507 in relation to the user's account information (e.g., a user ID).

According to an embodiment, the information about capability of performing a function may be information about a function of a device predefined to perform an operation. For example, when the device is an air conditioner, information about capability of performing a function of the air conditioner may indicate a function such as increasing or reducing a temperature, or purifying air. When the device is a speaker, information about capability of performing a function of the speaker may indicate a function, such as increasing or reducing a volume, playing music, or the like. The location information (e.g., information about a registered location) in the device information may represent a device location (e.g., a registered location) and include a name of a device location and/or a location coordinate value indicating the device location. For example, device location information may include a name indicating a designated place in the house, such as a room or a living room, or include a name of a location, such as a house or an office. For example, the device location information may include geo-fence information. Device status information in the device information may be, for example, information indicating a current status of the device including at least one of power on/off information and information about an operation currently being executed.

According to an embodiment, the IoT server 507 may obtain, determine, or generate a control command for controlling a device, based on the stored device information. The IoT server 507 may transmit a control command to a device (e.g., the electronic device 501, the external electronic device 502, or the IoT device 503) determined to perform an operation based on the information about an operation. The IoT server 507 may receive a result of performing the operation according to the control command from the device which has performed the operation. The IoT server 507 may be configured as a hardware device independent from an intelligent server (e.g., the intelligent server 200 of FIG. 2), but is not limited thereto. The IoT server 507 may be a component of an intelligent server (e.g., the intelligent server 200 of FIG. 2) or a server designed to be classified by software.

According to an embodiment, the IoT server 507 may use the stored device information to generate a retained device list for a device retained by a user and may transmit the retained device list to the electronic device 501. The device list may include information about one or more devices included in the device list. Information about the device may include a name (e.g., a title), type (e.g., a device ID), and/or location (e.g., a registered location) of a device. Also, the IoT server 507 may transmit information about a state of a retained device (e.g., the electronic device 501, the external electronic device 502, or the IoT device 503) to the electronic device 501.

According to an embodiment, the electronic device 501 may include at least one processor 520 (e.g., the processor 120 of FIG. 1 or the processor 203 of FIG. 2), a memory 530 (e.g., the memory 130 of FIG. 1 or the memory 207 of FIG. 2) electrically connected to the processor 520, and a display module 540 (e.g., the display module 160 of FIG. 1 or the display module 204 of FIG. 2) The electronic device 501 may support a voice assistant (e.g., a voice assistant service such as Bixby). An utterance suggestion module 550 included in the electronic device 501 may configure or support the voice assistant. The utterance suggestion module 550 may be executed by the processor 520 and include at least one of program code including instructions storable in the memory 530, an application, an algorithm, a routine, a set of instructions, or an AI learning model. In addition, the utterance suggestion module 550 may be implemented as hardware or firmware or a combination of hardware, firmware, and/or software. In addition, the utterance suggestion module 550 may be implemented as a separate server or may be implemented as an integrated server. The utterance suggestion module 550 may be implemented by being integrated into the processor 520 of the electronic device 501.

According to an embodiment, the utterance suggestion module 550 may generate a first suggested-utterance list that may be provided to a user. The utterance suggestion module 550 may generate the first suggested-utterance list including utterances which may be used by a (retained) device, based on a type of the (retained) device. The first suggested-utterance list may be a list from which utterances including functions not supported by the retained device have been removed, based on a model of the retained device.

According to an embodiment, the utterance suggestion module 550 may obtain voice metadata (e.g., voice metadata for a device corresponding to a device type) from the voice meta service 506, based on a device type of a (retained) device. The utterance suggestion module 550 may obtain a mode-name mapping table (e.g., a mode-name mapping table connecting to voice metadata) from the device mode name service 505 based on the voice metadata. The utterance suggestion module 550 may obtain a list of all utterances mapped to the voice metadata (e.g., a list of all utterances that may be used for the device type of the retained device). The utterance suggestion module 550 may generate an entire suggested-utterance list from the list of all utterances, based on the retained device list and the mode-name mapping table. For example, the utterance suggestion module 550 may generate the entire suggested-utterance list by inputting a name of a retained device included in the retained device list and a mode name (or a course name) in the mode-name mapping table to a device name variable and/or support mode variable of each utterance included in the entire suggested-utterance list. In this case, the utterance suggestion module 550 may remove utterances including a function not supported by the retained device from the entire suggested-utterance list based on the model (e.g., model information) of the retained device and then generate the first suggested-utterance list. The first suggested-utterance list may include only utterances that may be used by the user's retained device.

According to an embodiment, the utterance suggestion module 550 may obtain state information about the user's retained device. The state information may be obtained from the IoT server 507 and/or the retained device. The utterance suggestion module 550 may generate a second suggested-utterance list by extracting utterances to be (capable of being) successfully executed for the retained device from the first suggested-utterance list according to the state information. The utterance suggestion module 550 may, for example, acquire a precondition for executing, in the retained device, each utterance included in the first suggested-utterance list. The utterance suggestion module 550 may extract a precondition (e.g., a precondition of a device state) from the voice metadata of each utterance included in the first suggested-utterance list. The utterance suggestion module 550 may compare the precondition to the state information to extract, from the first suggested-utterance list, utterances capable of being successfully executed according to the state information and then generate the second suggested-utterance list.

Figure 6:
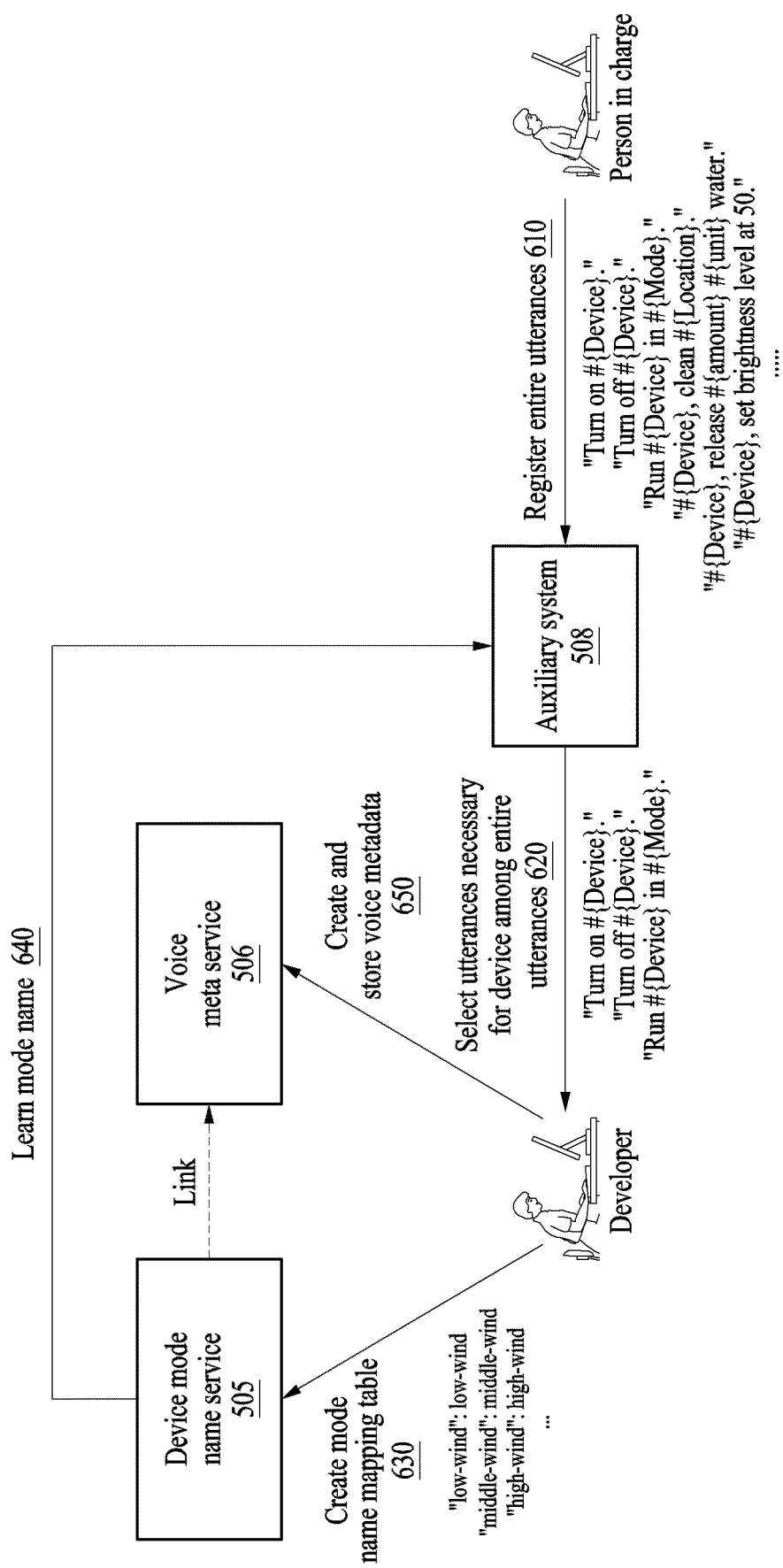
FIG. 6 is a diagram illustrating an example operation of generating voice metadata and a mode-name mapping table according to various embodiments.

FIG. 6 is a diagram illustrating an example operation of generating voice metadata and a mode-name mapping table according to various embodiments.

Referring to FIG. 6, according to an embodiment, voice metadata and a mode-name mapping table may be used for generating an entire utterance list for utterances (e.g., device control utterances) which may be used for a type of device (e.g., the electronic device 501, the external electronic device 502, or the IoT device 503) and may be created based on utterances registered in an auxiliary system 508. The auxiliary system 508 may be provided by, for example, a voice recognition system (e.g., the intelligent server 200 of FIG. 2). The auxiliary system 508 may be implemented as software. Some and/or all of the auxiliary system 508 may be implemented as an intelligent server (e.g., the intelligent server 200 in FIG. 2).

In operation 610, a person in charge (e.g., the person in charge of the voice recognition service) may register, in the auxiliary system 508, all utterances (e.g., a superset) that may be used for a device (e.g., the electronic device 501, the external electronic device 502, or the IoT device 503). There are some utterances which may be used only for a designated device and other utterances which may be generally used regardless of the device. For example, some utterances, such as "Turn on" and "Turn off", may be generally used regardless of the device, but other utterances "Clean up the living room" may be used only for a vacuum cleaner, such as a robot vacuum cleaner. The person in charge may register an utterance as it is in a natural language but may register an utterance including a variable defined in a voice recognition system to generate various utterances with a single registration. For example, when "#Turn on {Device}" is registered, utterances in as many variables available, such as "Turn on the light", "Turn on the air conditioner", and/or "Turn on the TV", may be generated with a single registration. Also, the person in charge may register an utterance in which a function of a device is included as a variable. When "Run #{Device} in #{Mode}" is registered, dozens of utterances may be processed with a single registration, such as "Run the air purifier in weak mode", "Run the air purifier in strong mode", "Run the TV in movie mode", "Run the TV in quiet mode", and/or "Run the massager in full-body emperor mode (or emperor mode)".

In operation 620, a device developer may select utterances (or necessary utterances) to be used for a device (e.g., the electronic device 501, the external electronic device 502, or the IoT device 503) among all the utterances registered in the auxiliary system 508.

In operation 630, when an utterance uses a mode name among the selected utterances, the device developer may create a mode-name mapping table for the mode used for the utterance. The mode-name mapping table created by the device developer may be stored and managed in the device mode name service 505.

In operation 640, the mode-name mapping table may be used for learning in the auxiliary system 508.

In operation 650, the device developer may create voice metadata for each of the selected utterances for the device. Each of the pieces of voice metadata may be mapped to its corresponding utterance. When a mode-name mapping table is created for an utterance among the selected utterances, the mode-name mapping table may link to voice metadata mapped to the utterance and an ID of the mode-name mapping table may be set in the voice metadata for linking. The voice metadata created by the device developer may be stored and managed in the voice meta service 506.

FIGS. 7A, 7B, 7C, 7D, 7E, 7F, and 7G are diagrams for explaining voice metadata according to various embodiments.

According to various embodiments, voice metadata may be related to device control logic for controlling a device (e.g., the electronic device 501, the external electronic device 502, or the IoT device 503) according to a user's utterance. The voice metadata may describe an execution path regarding an order of the device executing one or more device control commands for performing an operation corresponding to the user's utterance. In addition, the voice metadata may describe an execution path regarding an order of executing a plurality of device control commands to satisfy a precondition (e.g., a precondition state) necessary for the device to perform an operation corresponding to the user's utterance.

According to an embodiment, the voice metadata may be a file in a designated format (e.g., a JavaScript object notation (JSON) format) configured to be executable by a processor (e.g., the processor 520 of FIG. 5) and may include code which is executed by the processor to process the user's utterance. The voice metadata may include information about a device for which the voice metadata is used (e.g., a type and/or a vendor ID (VID)), a voice capability, and/or a voice action. The voice capability information may be information indicating a function of the device, and the voice action information may be information regarding how to perform the function of the device. The voice metadata may include nodes, which are the smallest logical units for performing a function.

Figure 7A:
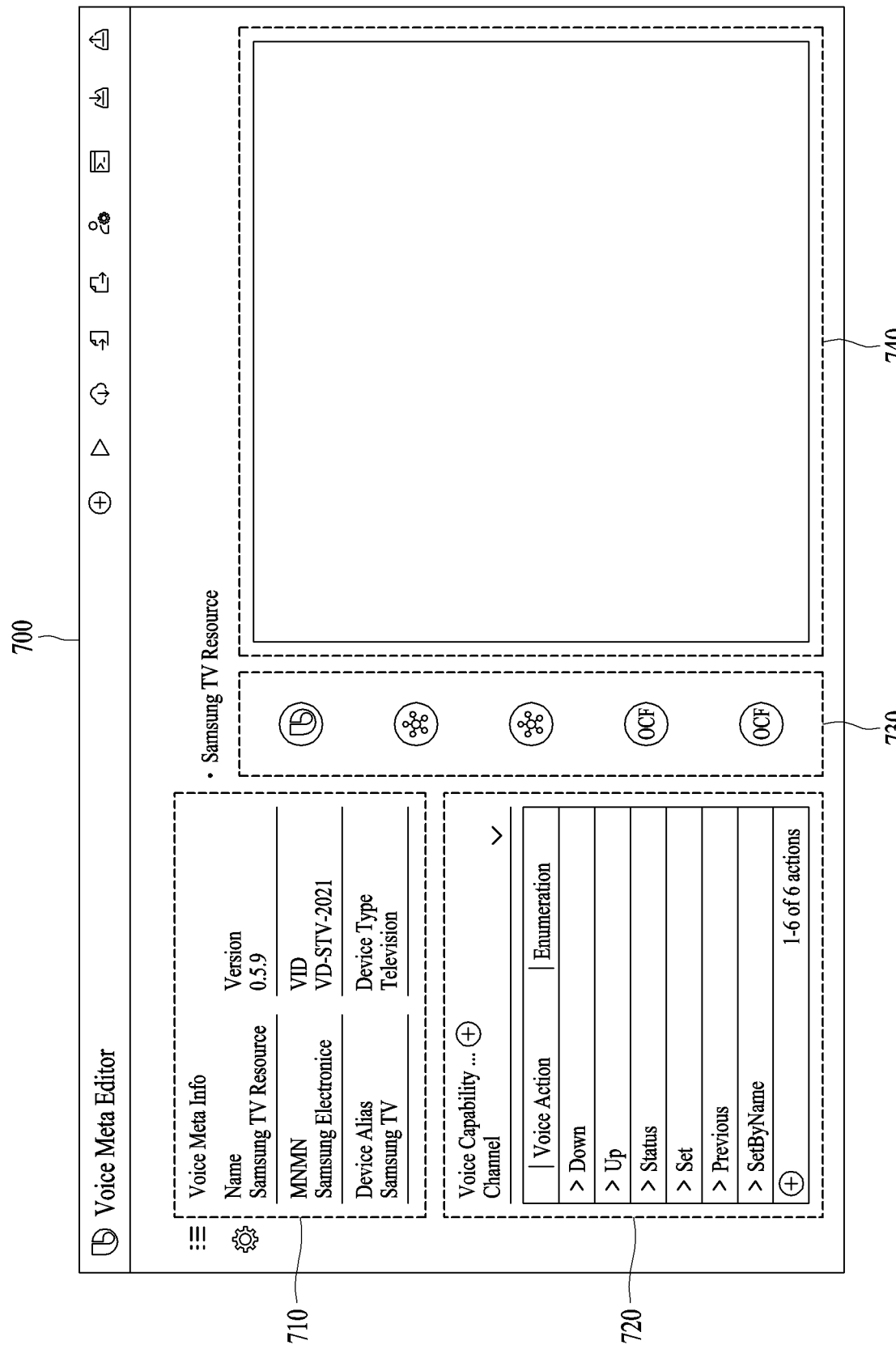

According to an embodiment, the device developer may refer to utterances registered in the auxiliary system 508 when the device developer draws up the voice metadata. The device developer may create the voice metadata through a user interface (e.g., a user interface of a voice metadata editor) as illustrated in FIGS. 7A, 7B, 7C, 7D, and 7E. The user interface for generating the voice metadata may include at least one of a program, an application, or a website, which may generate and/or edit the voice metadata. FIG. 7A may illustrate an example of a voice metadata editing screen 700. The voice metadata editing screen 700 may include an area 710 for providing voice metadata information, an area 720 for providing voice capability information, an area 730 for providing nodes used to configure voice metadata, and/or an area 740 for displaying a graph including nodes.

Figure 7B:
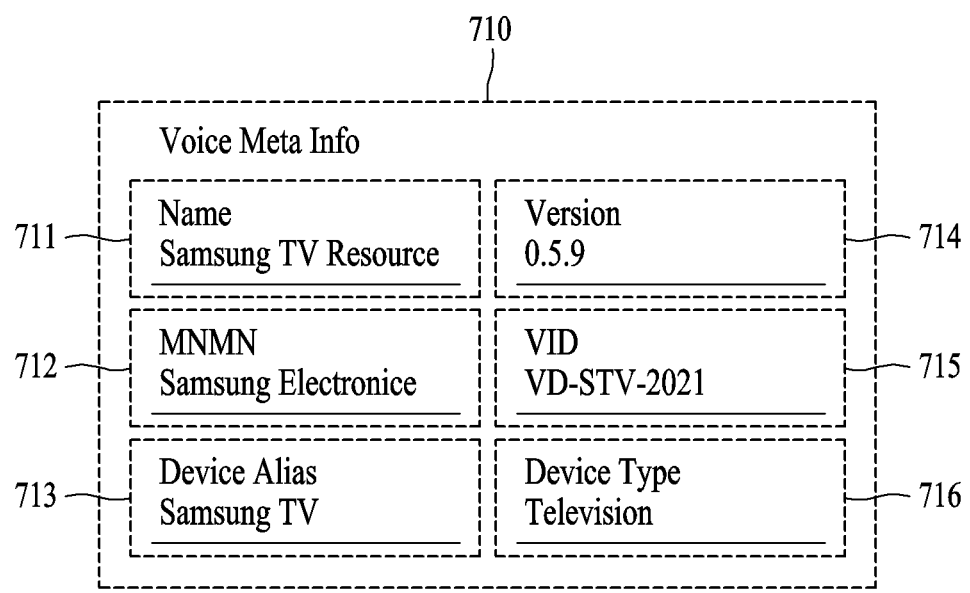

FIG. 7B may illustrate an example of an area 710 for providing voice metadata information. The area 710 for providing voice metadata information may include a device name 711 corresponding to the voice metadata, device manufacturer information 712, a device alias 713, a device (voice metadata) version 714, and a device VID 715, and/or a device type 716.

Figure 7C:
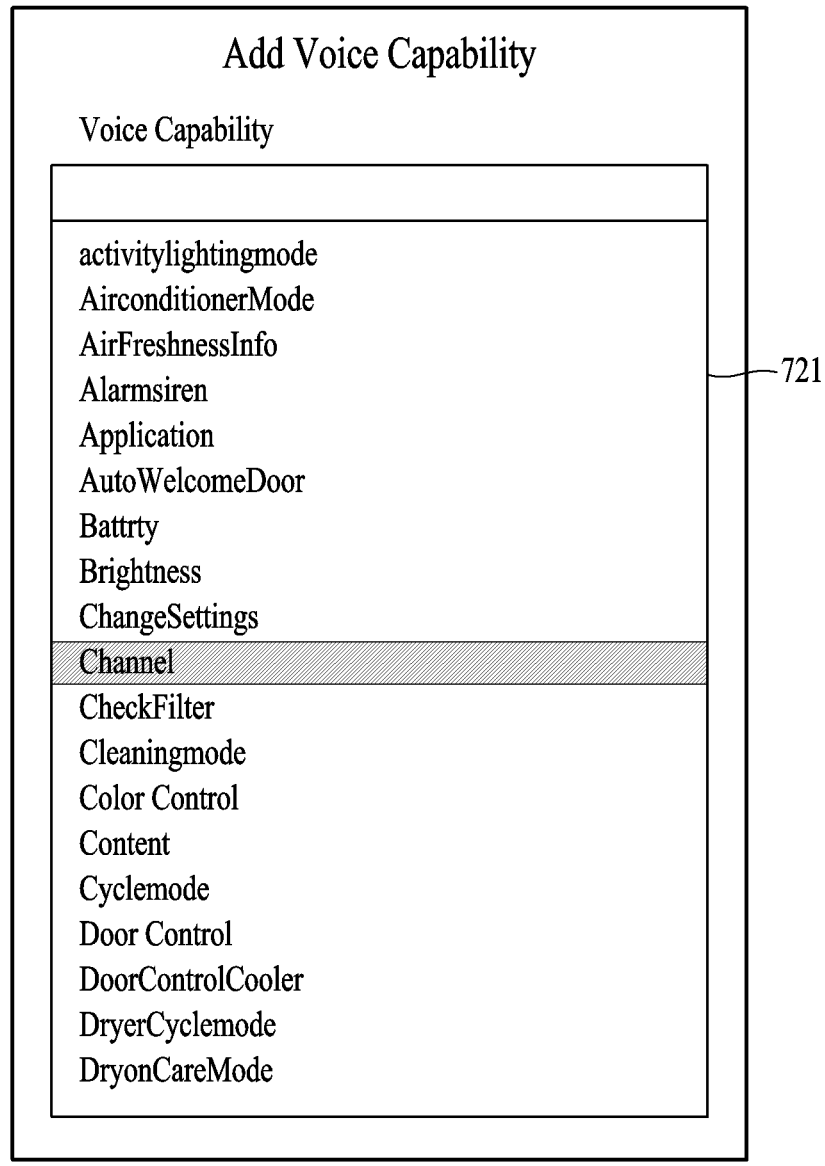

FIGS. 7C and 7D may illustrate voice capabilities, which may be added to a device when a developer creates metadata, and utterances respectively mapped to the voice capabilities. A user interface illustrated in FIG. 7C may provide a voice capability list 721 available. The user interface may provide the voice capability list 721 available for its corresponding device, based on device information corresponding to the voice metadata being edited. The user interface may provide the voice capability list 721 through the area 720 (FIG. 7A) for providing voice capability information. A user may select, from the voice capability list 721, a voice capability corresponding to intent of an utterance to be used in the voice metadata being edited. FIG. 7C may illustrate a case in which 'Channel' is selected from the voice capability list 721.

As illustrated in FIG. 7D, when the user selects a voice capability, the user interface may provide a voice action list 723 about the selected voice capability. The voice action list 723 may include a selection box 725, a voice action name 726, an enumeration 727, a data transmission method 728, and/or description 729. The description 729 may include (or may be mapped to) utterances registered in the auxiliary system 508. The user may select, from the voice action list 723, a voice action corresponding to intent of an utterance to be used in the voice metadata being edited. In FIG. 7D, when 'Set' is selected from the voice action list 723, 'Channel-Set' is selected as the intent of the utterance to be used in the voice metadata according to the user's input, and the voice metadata may be created for "Set #{Device} to channel 11". The device developer may create voice metadata for each of the six utterances of FIG. 7D.

Figure 7E:
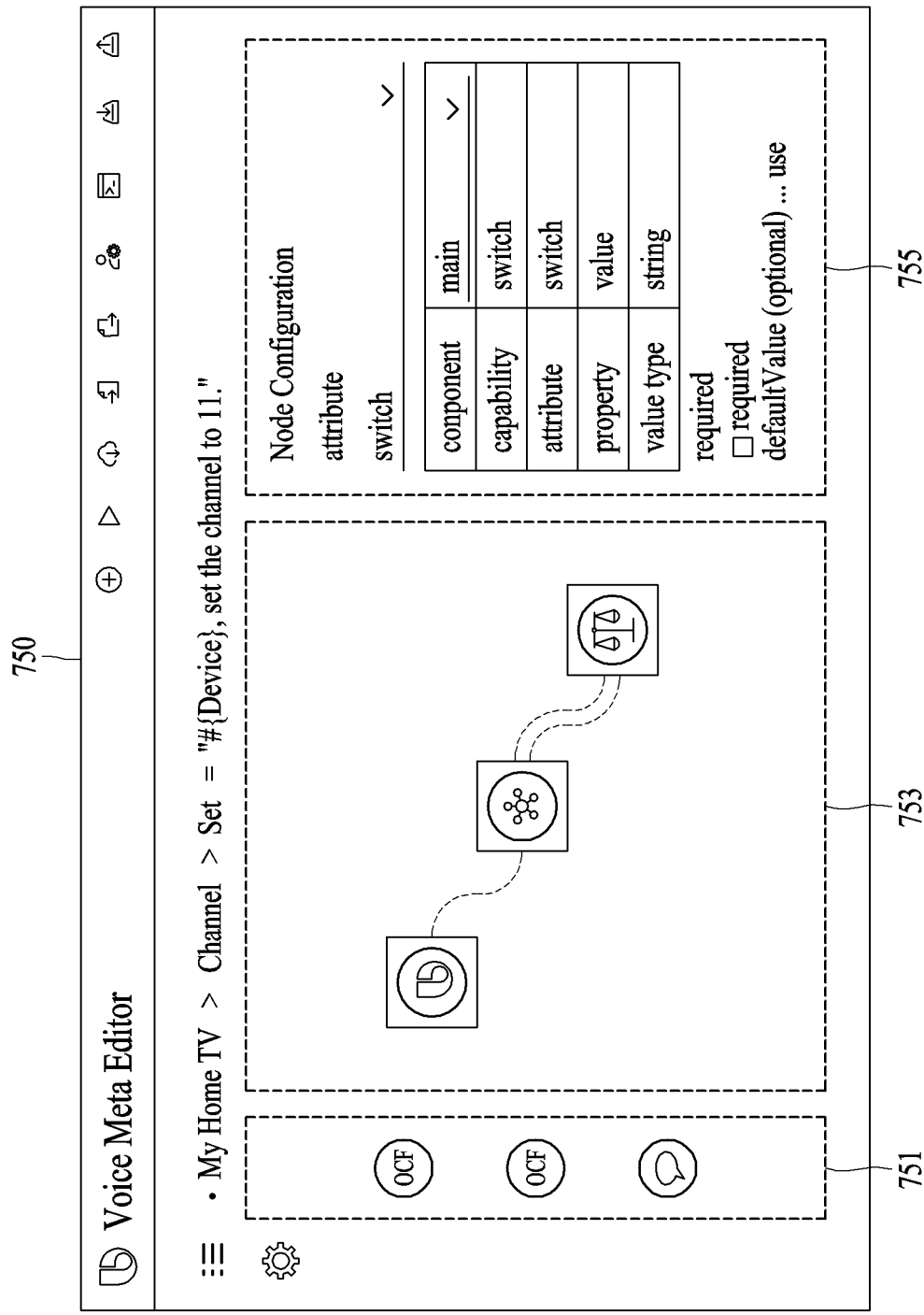

FIG. 7E may be a diagram illustrating an example of an interface for creating voice metadata based on a GUI. A user interface may provide a screen 750 for drawing up a precondition and device control logic based on a set (selected) voice intent. For example, a user interface (e.g., a voice metadata editor) may support drag-and-drop editing based on a node graph. A node may be the smallest logical unit constituting or included in voice metadata. A node may be the smallest logical unit with respect to performing a function. For example, the screen 750 may include an available node list 751, an area 753 for displaying a graph including nodes, and/or an area 755 for displaying node information. For example, the area 755 for displaying node information may include at least one piece of information about an attribute, a component, a capability, a property, and a value type.

Figure 7F:
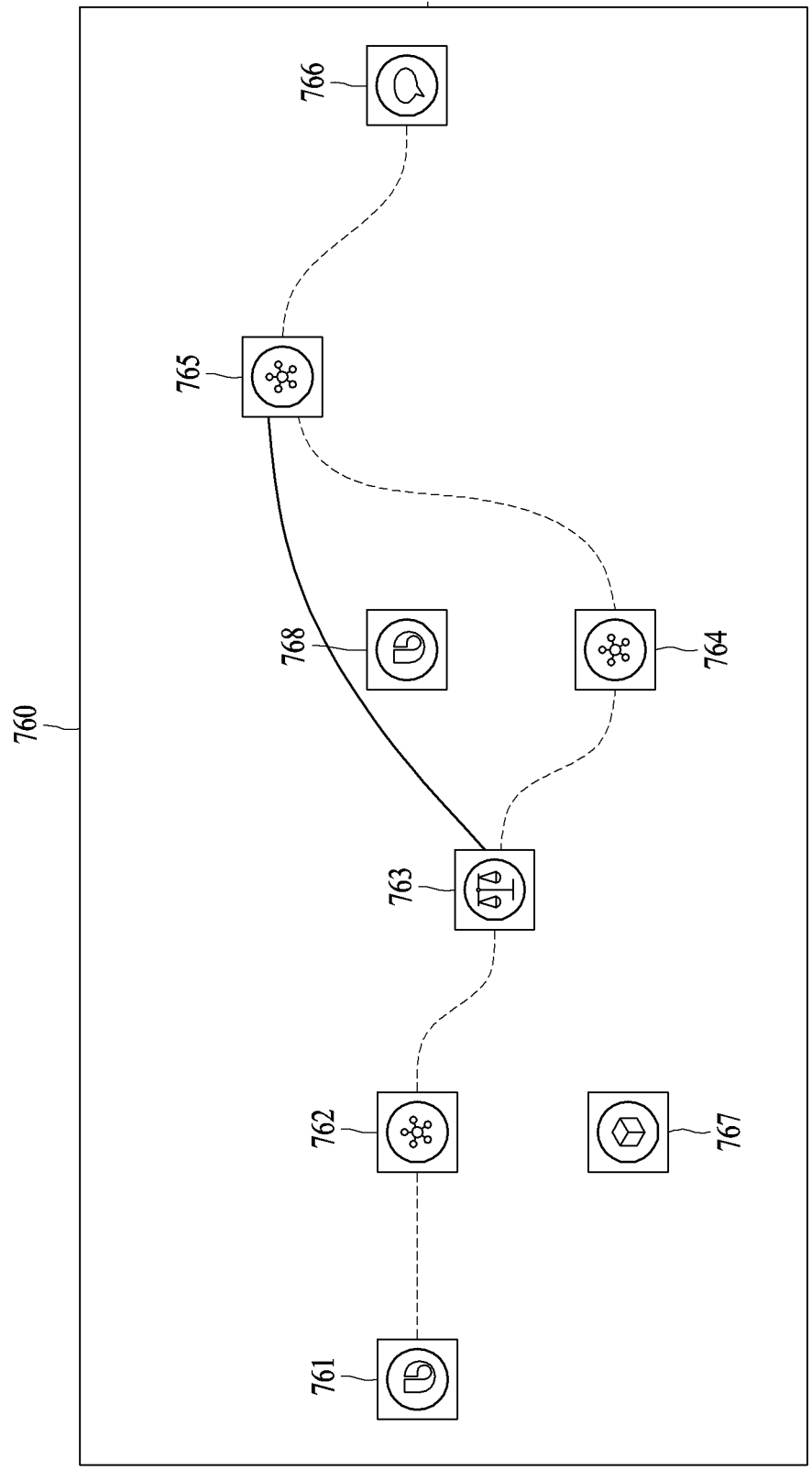
Figure 7G:
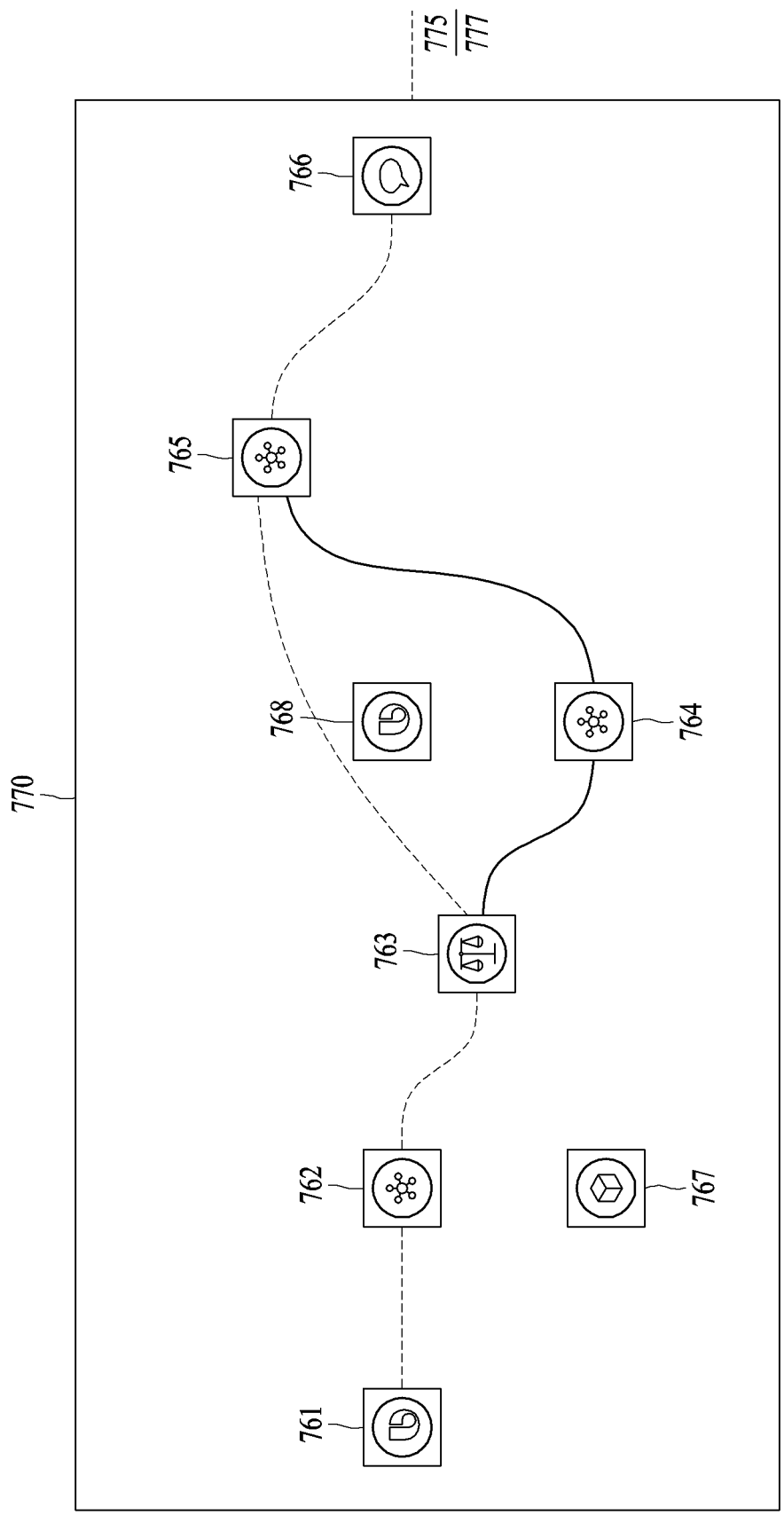

FIGS. 7F and 7G may illustrate examples of voice metadata for "Set #{Device} to channel 11". Voice metadata for "Set #{Device} to channel 11" is described hereinafter with reference to FIGS. 7F and 7G. FIGS. 7F and 7G illustrate graphs including branches (e.g., dashed-line routes 771 and 775 and solid-line routes 773 and 777). The dashed-line routes 771 and 775 may indicate routes in which nodes are executed based on a device state, and the solid-line routes 773 and 777 may indicate routes in which nodes are not executed.

A first node 761 may be a start node and set to correspond to a user's voice input "Set the TV to channel 11". A second node 762 may be configured to return a power state of the TV. The second node 762 may be set to return the value of 'on' when the TV is on and the value of 'off' when the TV is off. A seventh node 767 may be a node in which a constant value is set for comparison with the returned value of the second node 762. It may be assumed that the seventh node 767 sets the value of 'on' as a constant value.

A third node 763 may be configured to compare the value of the second node 762 to the value of the seventh node 767. The third node 763 may return the value of 'true' when the value of the second node 762 is the same as the value of the seventh node 767 and return the value of 'false' when the value of the second node 762 is different from the value of the seventh node 767. Since the seventh node 767 has a constant value indicating 'on', the returned value of 'true' may indicate that the TV is on and the returned value of 'false' may indicate that the TV is off. The returned value of 'false' from the third node 763 may execute a function of a fourth node 764, and the returned value of 'true' may execute a function of a fifth node 765. The third node 763 may be configured to determine whether state information about the device satisfies a precondition for performing an operation corresponding to the user's voice input.

The fourth node 764 may be configured to transmit a command to the TV to perform an operation of turning on the TV. When there is a precondition for performing an operation corresponding to the user's voice command and a device state does not satisfy the precondition, the fourth node 764 may be a node set to perform an operation corresponding to the precondition first.

The fifth node 765 may be configured to transmit a command to the TV to change a TV channel. An eighth node 768 may be a node configured to indicate a parameter value when the parameter value is required to perform an operation of the device in relation to the fifth node 765. The eighth node 768 may be configured to return the parameter value of '11' based on the user's voice input.

A sixth node 766 may indicate a node configured to provide a result of performing an operation of the device. The sixth node 766 may be configured to provide a voice response such as "Yes, I will turn on channel 11" when the corresponding node is executed.

FIG. 7F may illustrate, when the TV is off, a graph of nodes configured to perform an operation first corresponding to a precondition (e.g., turning on the TV) before performing an operation corresponding to a voice input as nodes are executed along the dashed-line route 771. FIG. 7G may illustrate, when the TV is on, a graph of nodes configured to perform an operation corresponding to a voice input (e.g., changing the TV channel to 11) without performing an operation corresponding to a precondition as nodes are executed along the dashed-line route 775.

FIGS. 7E, 7F, and 7G illustrate an example of generating voice metadata in a graph form including nodes but, according to an embodiment, a method of creating voice metadata is not limited thereto.

Figure 8B:
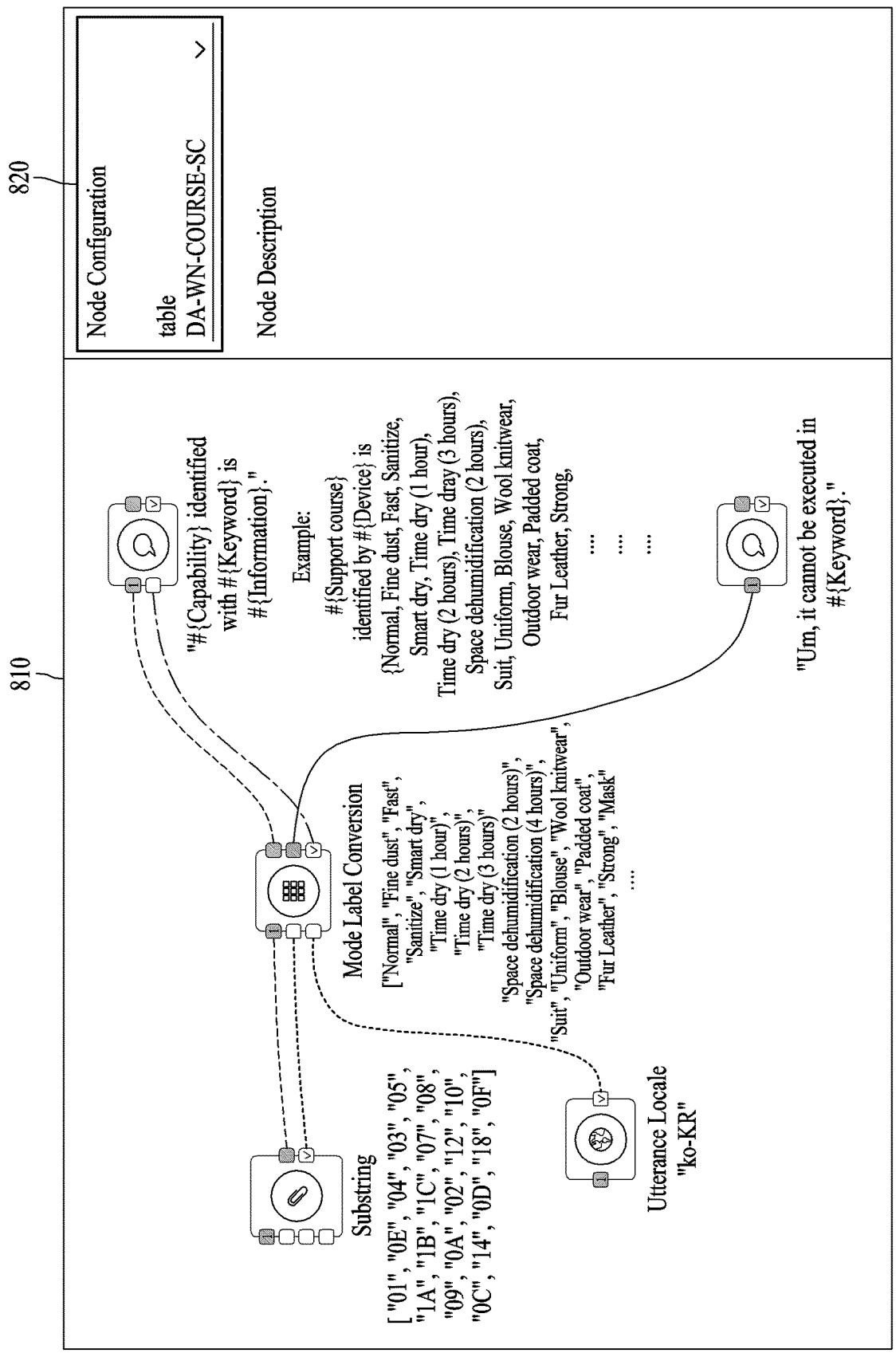

FIGS. 8A and 8B are diagrams illustrating an example mode-name mapping table according to various embodiments.

FIG. 8A illustrates an example of a mode-name mapping table 800 for functions provided by a device (e.g., an air dresser). FIG. 8B illustrates some of voice metadata 810 for an utterance "#{Device}, tell me about a support course" and may represent an example of actually changing a mode name based on the mode-name mapping table 800 during execution. In the mode-name mapping table 800, a function (e.g., an attribute) has a device mode value (e.g., 01, 02, 03, 00, . . . , 0C) of a name for each language and the device mode value may be created by a device developer. The mode-name mapping table 800 may supplement a difference between a name recognizable by a device (e.g., an air dresser) and a name recognizable by a person for enumerable functions provided by the device. The mode-name mapping table 800 may link to voice metadata 810 mapped to an utterance, for which the mode-name mapping table 800 is created, and an ID 820 of the mode-name mapping table 800 may be set in the voice metadata 810 for linking. When the utterance "Tell me about the air dresser support course" is executed, a value returned by the device, such as ["01", "0E", "04", . . . , "18", "0F"], may be difficult for a person to identify. However, when the voice metadata for the utterance "Tell me about the air dresser support course" is executed, a character string such as ["표준 (meaning normal in English)", "미세먼지 (meaning fine dust in English)", "급속 (meaning fast in English)", "살균 (meaning sanitize in English)", . . . , "내부 살균 (meaning self-clean in English)" (e.g., in Korean)] may be created, based on the mode-name mapping table.

Figure 9:
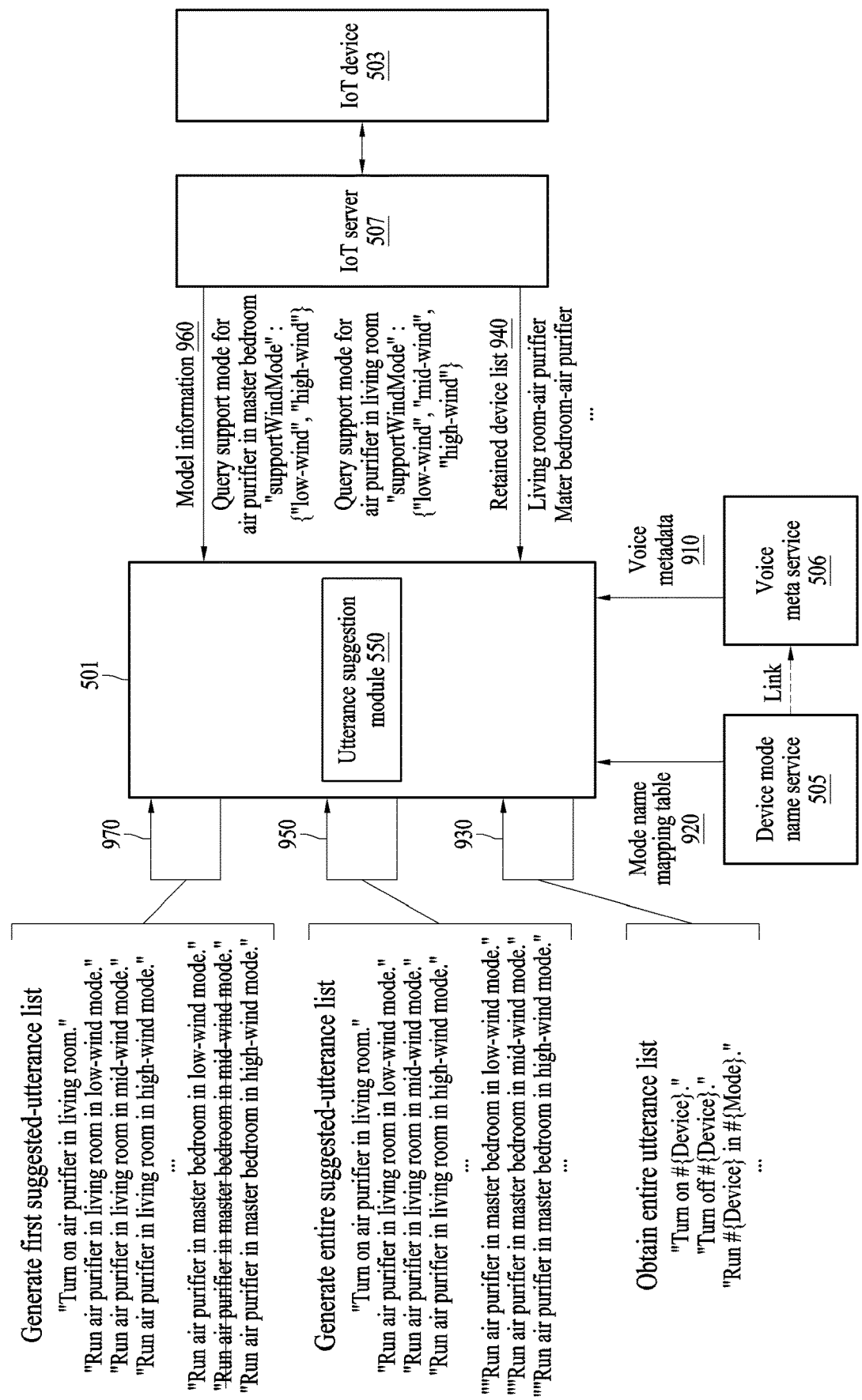
FIG. 9 is a diagram illustrating an example operation of generating a suggested-utterance list, according to various embodiments.

FIG. 9 is a diagram illustrating an example operation of generating a suggested-utterance list, according to various embodiments.

FIG. 9 may be used for explaining an operation of an electronic device 501 generating a first suggested-utterance list. Operations 910 to 970 may be performed sequentially, but the disclosure is not limited in this respect. For example, an order of operations 910 to 970 may change and at least two of operations 910 to 970 may be performed in parallel.

In operation 910, the electronic device 501 may obtain voice metadata (e.g., voice metadata for an air purifier) from the voice meta service 506 based on a type (e.g., air purifier) of a user's retained device (e.g., the electronic device 501, the external electronic device 502, or the IoT device 503). The electronic device 501 may acquire voice metadata for all utterances.

In operation 920, the electronic device 501 may obtain a mode-name mapping table (e.g., a mode-name mapping table for an air purifier) from the device mode name service 505 based on the voice metadata. The mode-name mapping table may link to the voice metadata.

In operation 930, the electronic device 501 may obtain an entire utterance list (e.g., a list of all utterances that may be used in the air purifier) mapped to the voice metadata. The entire utterance list may be a list of all utterances available in the type of the retained device. The entire utterance list may include utterances including one or more variables (e.g., #{Device} and #{Mode}). For example, the entire utterance list for the air purifier may include utterances such as "Turn on #{Device}", "Turn off #{Device}", and/or "Run #{Device} in #{Mode}".

In operation 940, the electronic device 501 may obtain a retained device list from the IoT server 507. The retained device list may include information about a retained device of the user (e.g., a living room air purifier and a master bedroom air purifier).

In operation 950, the electronic device 501 may generate an entire suggested-utterance list from the entire utterance list, based on the retained device list and the mode-name mapping table. The electronic device 501 may generate the entire suggested-utterance list by inputting a name of the retained device included in the retained device list and a mode name (or a course name) in the mode-name mapping table to a device name variable and/or a support mode variable of each utterance included in the entire utterance list. For example, the entire suggested-utterance list for the air purifier may include suggested utterances, such as "Turn on the air purifier in the living room", "Run the air purifier in the living room in low-wind mode", "Run the air purifier in the living room in mid-wind mode", "Run the air purifier in the living room in high-wind mode", "Run the air purifier in the master bedroom in low-wind mode", "Run the air purifier in the master bedroom in mid-wind mode", and/or "Run the air purifier in the master bedroom in high-wind mode".

In operation 960, the electronic device 501 may obtain model information of the retained device from the IoT server 507 and/or the retained device. The model information may include support mode information (e.g., support function information) according to the model of the retained device. The electronic device 501 may obtain the model information of the retained device by querying for and identifying a function supported by the retained device. For example, the electronic device 501 may identify that the air purifier in the living room supports low-wind, mid-wind, and high-wind modes and identify that the air purifier in the master bedroom supports low-wind and high-wind modes.

In operation 970, the electronic device 501 may generate the first suggested-utterance list from the entire suggested-utterance list based on the model information. The electronic device 501 may generate the first suggested-utterance list by removing utterances including a function not supported by the retained device from the entire suggested-utterance list. For example, since the air purifier in the master bedroom does not support mid-wind mode, the electronic device 501 may remove a suggested utterance including the mid-wind mode of the air purifier in the master bedroom from the entire suggested-utterance list. The electronic device 501 may generate the first suggested-utterance list including only utterances which may be used for the retained device.

Figure 10A:
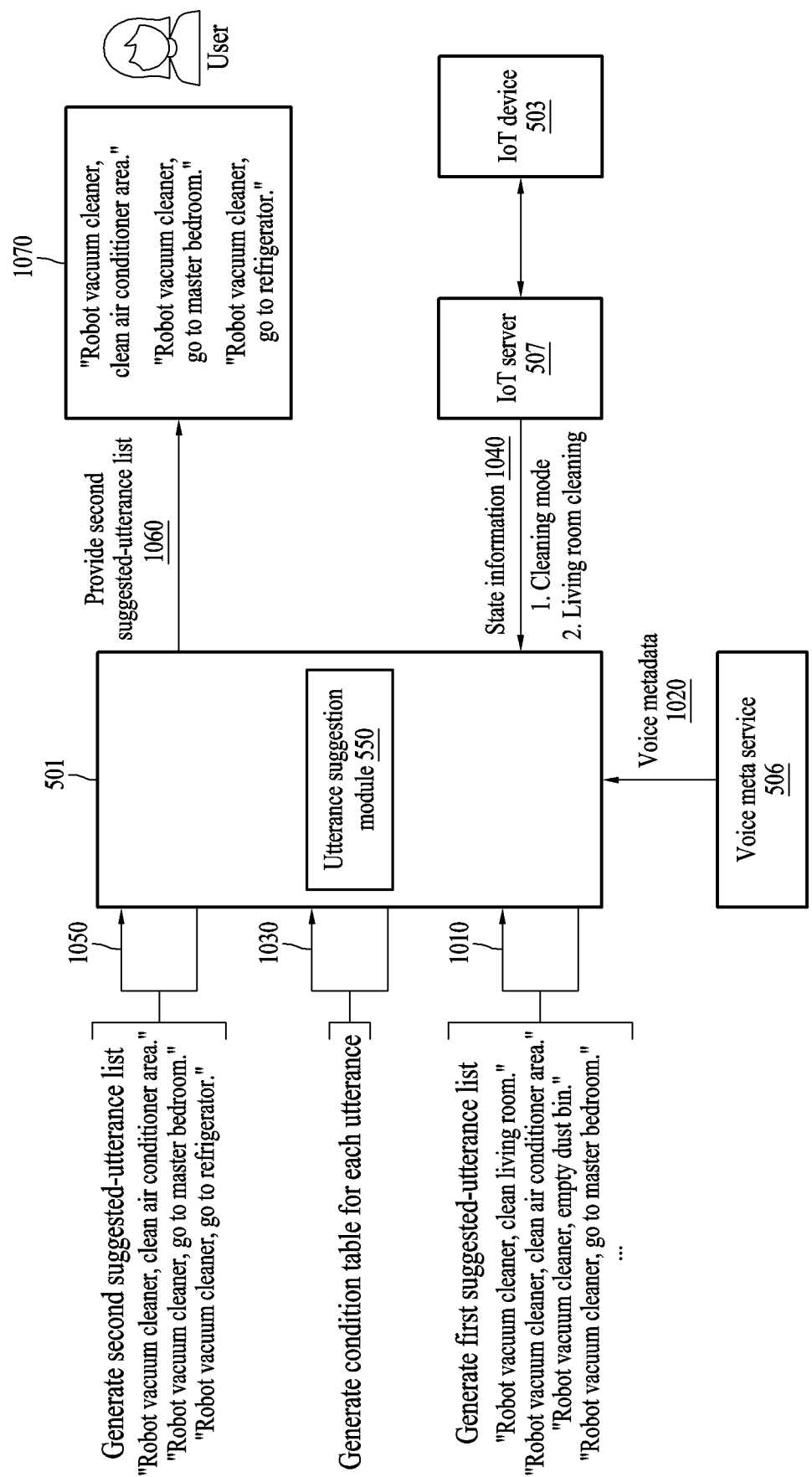

FIGS. 10A and 10B are diagrams illustrating an example operation of generating a suggested-utterance list according to various embodiments.

FIG. 10A may illustrate an operation in which an electronic device 501 generates a second suggested-utterance list, and FIG. 10B may illustrate an example of a condition table for generating the second suggested-utterance list. Operations 1010 to 1060 may be performed sequentially, but the disclosure is not limited in this respect. For example, the order of operations 1010 to 1060 may change and at least two of operations 1010 to 1060 may be performed in parallel.

In operation 1010, the electronic device 501 may generate a first suggested-utterance list based on a user's retained device (e.g., a robot vacuum cleaner). The electronic device 501 may, for example, perform operations 910 to 970 of FIG. 9 to generate the first suggested-utterance list. The first suggested-utterance list may be generated in advance and stored in the electronic device 501. For example, the first suggested-utterance list may include utterances which may be used for the robot vacuum cleaner, such as "Robot vacuum cleaner, clean the living room", "Robot vacuum cleaner, clean the air conditioner area", "Robot vacuum cleaner, empty the dust bin", "Robot vacuum cleaner, go to the master bedroom", and/or "Robot vacuum cleaner, go to the refrigerator".

In operation 1020, the electronic device 501 may obtain voice metadata from the voice meta service 506. In this case, the electronic device 501 may obtain the voice metadata (e.g., device control logic) for all suggested utterances included in the first suggested-utterance list.

In operation 1030, the electronic device 501 may generate a condition table (e.g., the condition table 1080 of FIG. 10B) by extracting, from the voice metadata, a precondition (e.g., a device state precondition) for executing each suggested utterance included in the first suggested-utterance list. As shown in FIG. 10B, the condition table 1080 may include a precondition for executing each utterance. The condition table 1080 may include a plurality of fields, such as Utterance 1081, Command 1082, Value 1083, and/or Operator 1084. In the condition table 1080, a state (e.g., a state of utterances to be successfully executed) of a device (e.g., a retained device) may be identified based on contents stored in the Utterance 1081, the Command 1082, the Value 1083, and the Operator 1084. For example, the utterance "Robot vacuum cleaner, empty the dust bin" may be successfully executed when a precondition is satisfied that the robot vacuum cleaner is charging (e.g., value ("Control_Charging"), supports a function of emptying the dust bin (e.g. value ("DustEmit_Visible") and is not in a state of emptying the dust bin (e.g., value ("Control_EmitDust" and operator ("False")). The condition table 1080 may be stored in the memory 530 of the electronic device 501.

In operation 1040, the electronic device 501 may obtain status information (e.g., current status information) of the retained device from the IoT server 507 and/or the retained device. For example, the electronic device 501 may obtain current state information (e.g., cleaning mode and cleaning the living room) about the retained device, the robot vacuum cleaner. The electronic device 501 may obtain changed state information about the retained device, whenever changed.

In operation 1050, the electronic device 501 may generate a second suggested-utterance list based on the state information about the retained device. The electronic device 501 may generate the second suggested-utterance list by extracting utterances capable of being successfully executed for the retained device from the first suggested-utterance list according to the state information about the retained device. The electronic device 501 may obtain, from the condition table 1080, a precondition for executing, in the retained device, each utterance included in the first suggested-utterance list. The electronic device 501 may generate the second suggested-utterance list by comparing the precondition to the state information and extracting utterances capable of being successfully executed according to the state information from the first suggested-utterance list. For example, since the robot vacuum cleaner is currently in a cleaning mode and cleaning the living room, the electronic device 501 may extract utterances capable of being successfully executed from the first suggested-utterance list such as "Robot vacuum cleaner, clean the air conditioner area", "Robot vacuum cleaner, go to the master bedroom", and "Robot vacuum cleaner, go to the refrigerator" and may generate the second suggested-utterance list including "Robot vacuum cleaner, clean the air conditioner area", "Robot vacuum cleaner, go to the master bedroom", and "Robot vacuum cleaner, go to the refrigerator". The electronic device 501 may remove an utterance(s) not capable of being successfully executed according to the current state of the robot vacuum cleaner from the first suggested-utterance list and generate the second suggested-utterance list.

In operation 1060, the electronic device 501 may provide the second suggested-utterance list to a user. The second suggested-utterance list may be displayed in the form of a UI 1070. The UI 1070 may be displayed on the electronic device 501 and/or an external electronic device (e.g., the external electronic device 502 of FIG. 5).

According to an embodiment, the electronic device 501 may perform operations 1010 to 1030 in advance to generate and store the first suggested-utterance list and the condition table 1080. The electronic device 501 may perform operations 1040 to 1060 to generate the second suggested-utterance list. An event may include at least one of an event of displaying a suggested utterance to a user (e.g., running a voice assistant) and an event of changing a state (e.g., a current operating state) of a retained device.

According to an embodiment, the electronic device 501 may update the second suggested-utterance list and provide the second suggested-utterance list to the user whenever the state information about the retained device is updated (e.g., changed).

Figure 11A:
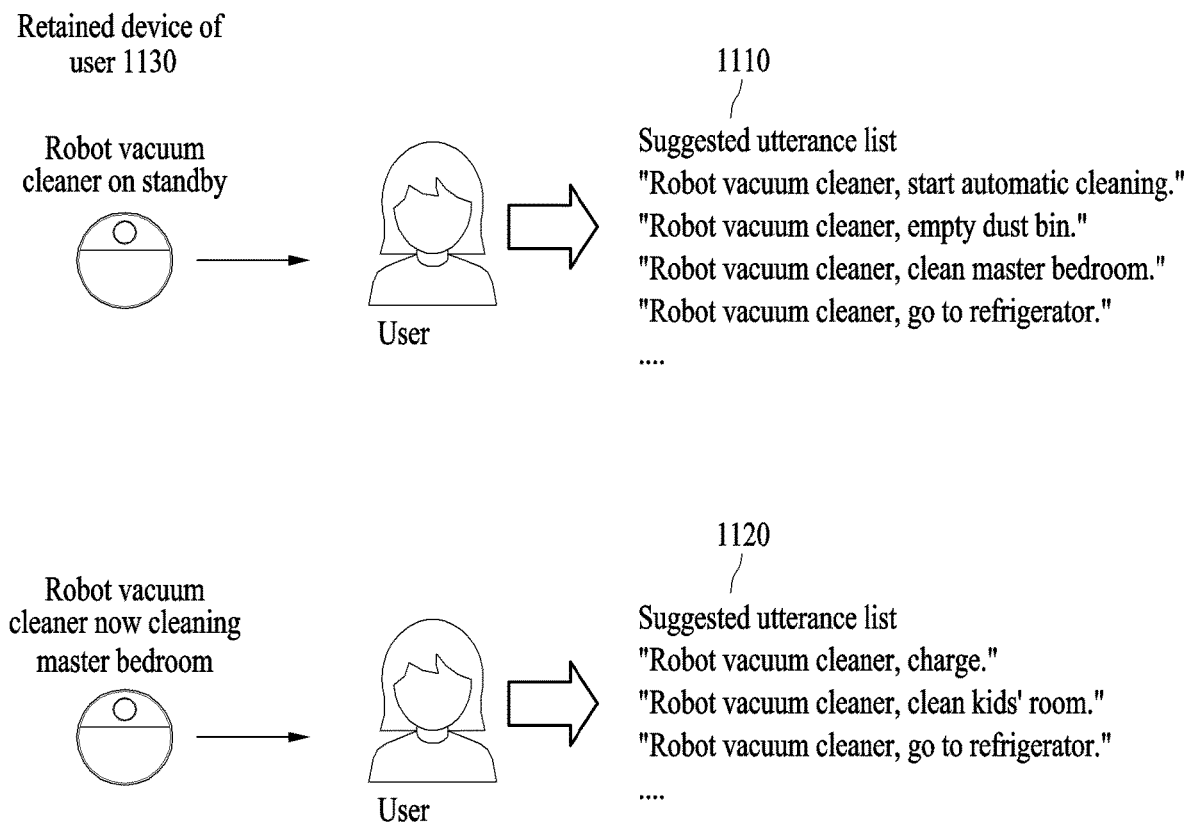
FIGS. 11A and 11B are diagrams illustrating examples of generating and providing a suggested-utterance list according to various embodiments.
Figure 11B:
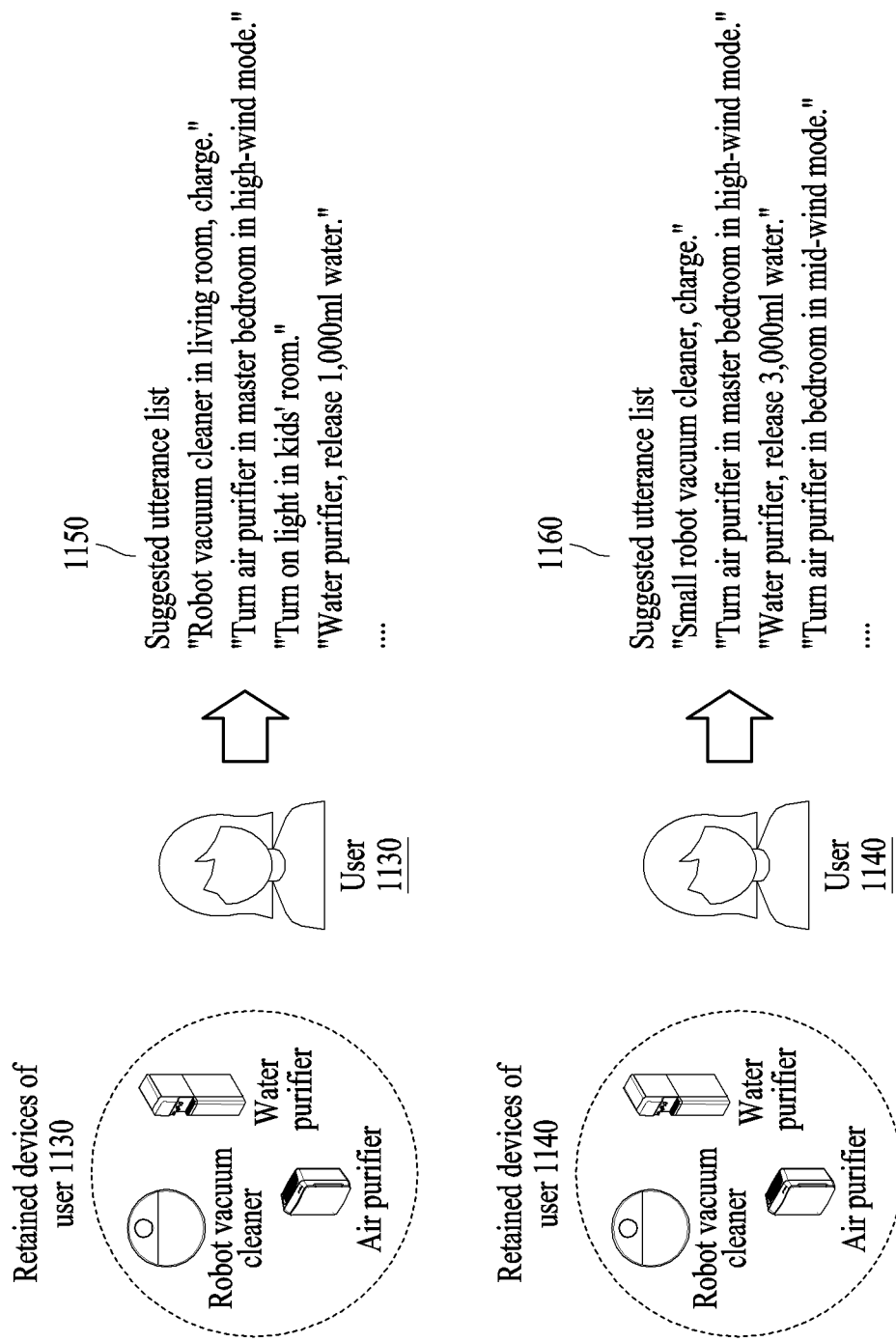

FIGS. 11A and 11B are diagrams illustrating examples of generating and providing a suggested-utterance list according to various embodiments.

FIG. 11A may illustrate a case in which a suggested-utterance list (e.g., a second suggested-utterance list) provided to a user changes depending on a current state of a retained device (e.g., a cleaner) of a user 1130. Referring to FIG. 11A, when an event (e.g., an event of executing a voice assistant and/or an event in which a state of a retained device changes) occurs, a suggested-utterance list 1110 is provided to the user 1130 and when a vacuum cleaner is in a cleaning state, a suggested-utterance list 1120 may be provided to the user 1130.

FIG. 11B may illustrate a case in which a suggested-utterance list (e.g., the second suggested-utterance list) provided to a user varies depending on the user. Referring to FIG. 11B, a user 1130 has a robot cleaner, an air purifier (e.g., the air purifier in the master bedroom), and a water purifier as registered retained devices and a user 1140 has a robot cleaner, two air purifiers (e.g., one in the master bedroom and the other in a bedroom), and a latest water purifier as registered retained devices. When an event (e.g., an event of executing a voice assistant and/or an event in which a state of a retained device changes) occurs, the user 1130 may be provided with a suggested-utterance list 1150 according to the retained device of the user 1130 and the state thereof and the user 1140 may be provided with a suggested-utterance list 1160 according to a retained device of the user 1140 and the state thereof.

Figure 12:
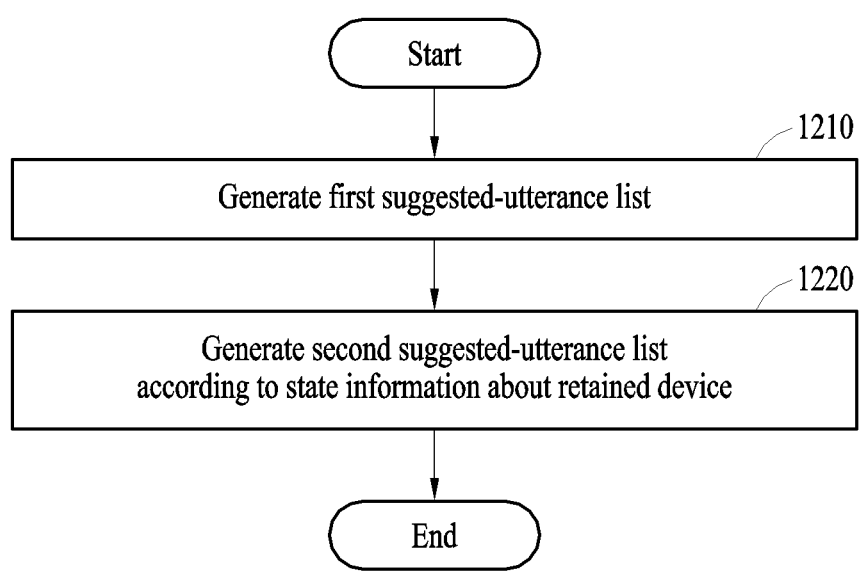
FIG. 12 is a diagram illustrating an operation of an example electronic device according to various embodiments.

FIG. 12 is a diagram illustrating an operation of an example electronic device according to various embodiments.

In operation 1210, an electronic device 501 may generate a first suggested-utterance list that may be provided to a user. The first suggested-utterance list may be related to a device control utterance for controlling a retained device registered to the user.

In operation 1220, the electronic device 501 may extract utterances to be successfully executed for the retained device from the first suggested-utterance list according to state information about the retained device registered to the user and then generate a second suggested-utterance list. The second suggested-utterance list may be related to a device control utterance for controlling the retained device and may be a personalized suggested-utterance list reflecting the state of the retained device.

An electronic device (e.g., the electronic device 101 of FIG. 1, the electronic device 201 of FIG. 2, the intelligent server 200 of FIG. 2, and the electronic device 501 of FIG. 5) according to an embodiment may include a memory (e.g., the memory 130 of FIG. 1, the memory 207 of FIG. 2, or the memory 530 of FIG. 5) configured to store instructions and a processor (e.g., the processor 120 of FIG. 1, the processor 203 of FIG. 2, and the processor 520 of FIG. 5) electrically connected to the memory and configured to execute the instructions. When the instructions are executed by the processor, the processor may be configured to generate a first suggested-utterance list providable to a user (e.g., operation 1210 of FIG. 12) and generate a second suggested-utterance list by extracting, from the first suggested-utterance list, utterances capable of successful execution for a device registered to the user, according to state information about the registered device (e.g., operation 1220 of FIG. 12).

According to an embodiment, the first-suggested utterance list and the second suggested-utterance list may relate to a device control utterance for controlling the registered device.

According to an embodiment, the processor may be configured to update the second suggested-utterance list and provide the updated second suggested-utterance list based on the state information about the registered device being updated.

According to an embodiment, the processor may be configured to obtain a precondition for executing, in the registered device, each utterance included in the first suggested-utterance list and generate the second suggested-utterance list by comparing the precondition to the state information and extracting, from the first suggested-utterance list, utterances capable of successful execution according to the state information.

According to an embodiment, the processor may be configured to extract the precondition from voice metadata of each utterance included in the first suggested-utterance list.

According to an embodiment, the processor may be configured to generate the second suggested-utterance list in response to an event.

According to an embodiment, the event may include at least one of an event of displaying a suggested utterance to the user or an event in which a state of the registered device changes.

According to an embodiment, the event of displaying the suggested utterance to the user may include executing a voice assistant, e.g., by the user.

According to an embodiment, the processor may be configured to generate the first suggested-utterance list including utterances usable by the registered device based on a device type of the registered device.

According to an embodiment, the processor may be configured to generate the first suggested-utterance list from which utterances including functions not supported by the registered device are removed, based on a model of the registered device.

A method of operating an electronic device (e.g., the electronic device 101 of FIG. 1, the electronic device 201 of FIG. 2, the intelligent server 200 of FIG. 2, and the electronic device 501 of FIG. 5), according to an embodiment, may include generating a first suggested-utterance list providable to a user (e.g., operation 1210 of FIG. 12) and generating a second suggested-utterance list by extracting, from the first suggested-utterance list, utterances capable of successful execution for a device registered to the user according to state information about the registered device (e.g., operation 1220 of FIG. 12).

According to an embodiment, the first suggested-utterance list and the second suggested-utterance list may relate to a device control utterance for controlling the registered device.

According to an embodiment, the method may further include updating the second suggested-utterance list and providing the updated second suggested-utterance list based on the state information about the registered device being updated.

According to an embodiment, the generating of the second suggested-utterance list may include obtaining a precondition for executing, in the registered device, each utterance included in the first suggested-utterance list and generating the second suggested-utterance list by comparing the precondition to the state information and extracting, from the first suggested-utterance list, utterances capable of successful execution according to the state information.

According to an embodiment, the obtaining of the precondition may include extracting the precondition from voice metadata of each utterance included in the first suggested-utterance list.

According to an embodiment, the generating of the second suggested-utterance list may include generating the second suggested-utterance list in response to an event.

According to an embodiment, the event may include at least one of an event of displaying a suggested utterance to the user or an event in which a state of the registered device changes.

According to an embodiment, the event of displaying the suggested utterance to the user may include executing a voice assistant, e.g., by the user.

According to an embodiment, the generating of the first suggested utterance list may include generating the first suggested-utterance list including utterances usable by the registered device, based on a device type of the registered device.

According to an embodiment, the generating of the first suggested-utterance list may include generating the first suggested-utterance list from which utterances including functions not supported by the registered device are removed, based on a model of the registered device.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
   memory configured to store instructions; and
   at least one processor electrically connected to the memory and configured individually or collectively to execute the instructions and to control the electronic device to:
   generate a first suggested-utterance list providable to a user;
   obtain voice metadata of each utterance included in the first suggested-utterance list;
   generate a second suggested-utterance list by extracting, from the first suggested-utterance list, utterances capable of successful execution by the controllable device, according to pre-conditions for executing commands corresponding to utterances in the first suggested-utterance list and current state information about the controllable device;
   display the second suggested-utterance list; and
   transmit a command based on an utterance included in the second suggested-utterance list for controlling the controllable device,
   wherein at least one processor is configured individually or collectively to cause the electronic device to:
   obtain, from the voice metadata, a precondition for executing, in the controllable device, each utterance included in the first suggested-utterance list; and
   generate the second suggested-utterance list by comparing the precondition to the current state information and extracting, from the first suggested-utterance list, utterances capable of successful execution according to the state information.

2. The electronic device of claim 1, wherein at least one processor is configured, individually or collectively, to, when the instructions are executed by the at least one processor, cause the electronic device to update the second suggested-utterance list and provide the updated second suggested-utterance list based on the state information about the controllable device being updated.

3. The electronic device of claim 1, wherein at least one processor is configured, individually or collectively, to, when the instructions are executed by the at least one processor, cause the electronic device to generate the second suggested-utterance list in response to an event.

4. The electronic device of claim 3, wherein the event comprises at least one of an event of displaying a suggested utterance to the user or an event in which a state of the controllable device changes.

5. The electronic device of claim 4, wherein the event of displaying the suggested utterance to the user comprises executing a voice assistant.

6. The electronic device of claim 1, wherein at least one processor is configured, individually or collectively, to, when the instructions are executed by the at least one processor, cause the electronic device to generate the first suggested-utterance list comprising utterances usable by the controllable device based on a device type of the controllable device.

7. The electronic device of claim 6, wherein at least one processor is configured, individually or collectively, to, when the instructions are executed by the at least one processor, cause the electronic device to generate the first suggested-utterance list from which utterances comprising functions not supported by the controllable device are removed, based on a model of the controllable device.

8. A method of operating an electronic device, the method comprising:
   generating a first suggested-utterance list providable to a user;
   obtaining voice metadata of each utterance included in the first suggested-utterance list;
   generating a second suggested-utterance list by extracting, from the first suggested-utterance list, utterances capable of successful execution by the controllable device according to pre-conditions for executing commands corresponding to utterances in the first suggested-utterance list and current state information about the controllable device;
   displaying the second suggested-utterance list; and
   transmitting a command based on an utterance included in the second suggested-utterance list for controlling the controllable device, wherein
   the method further comprises:
   obtaining, from the voice metadata, a precondition for executing, in the controllable device, each utterance included in the first suggested-utterance list; and
   generating the second suggested-utterance list by comparing the precondition to the current state information and extracting, from the first suggested-utterance list, utterances capable of successful execution according to the state information.

9. The method of claim 8, further comprising updating the second suggested-utterance list and providing the updated second suggested-utterance list based on the state information about the controllable device being updated.

10. The method of claim 8, wherein the generating of the second suggested-utterance list comprises generating the second suggested-utterance list in response to an event.

11. The method of claim 10, wherein the event comprises at least one of an event of displaying a suggested utterance to the user or an event in which a state of the controllable device changes.

12. The method of claim 11, wherein the event of displaying the suggested utterance to the user comprises executing a voice assistant.

13. The method of claim 8, wherein the generating of the first suggested-utterance list comprises generating the first suggested-utterance list comprising utterances usable by the controllable device, based on a device type of the controllable device.

14. The method of claim 13, wherein the generating of the first suggested-utterance list comprises generating the first suggested-utterance list from which utterances comprising functions not supported by the controllable device are removed, based on a model of the controllable device.

* * * * *